US008521748B2

(12) United States Patent
Slezak et al.

(10) Patent No.: US 8,521,748 B2
(45) Date of Patent: Aug. 27, 2013

(54) SYSTEM AND METHOD FOR MANAGING METADATA IN A RELATIONAL DATABASE

(75) Inventors: Dominik Slezak, Warsaw (PL); Graham Toppin, North York (CA); Marcin Kowalski, Warsaw (PL); Arkadiusz Wojna, Warsaw (PL)

(73) Assignee: Infobright Inc., Toronto, Ontario (CA)

( * ) Notice: Subject to any disclaimer, the term of this patent is extended or adjusted under 35 U.S.C. 154(b) by 121 days.

(21) Appl. No.: 13/160,451

(22) Filed: Jun. 14, 2011

(65) Prior Publication Data
US 2011/0307472 A1 Dec. 15, 2011

Related U.S. Application Data

(60) Provisional application No. 61/354,686, filed on Jun. 14, 2010.

(51) Int. Cl.
G06F 7/10 (2006.01)
G06F 17/30 (2006.01)

(52) U.S. Cl.
USPC ........... 707/741; 707/719; 707/755; 707/802; 707/791

(58) Field of Classification Search
None
See application file for complete search history.

(56) References Cited

U.S. PATENT DOCUMENTS

| | | | |
|---|---|---|---|
| 5,463,772 A | 10/1995 | Thompson et al. |
| 5,551,027 A | 8/1996 | Choy et al. |
| 5,696,960 A | 12/1997 | Bhargava et al. |
| 5,794,228 A | 8/1998 | French et al. |
| 5,794,229 A | 8/1998 | French et al. |
| 5,794,246 A | 8/1998 | Sankaran et al. |
| 5,838,964 A | 11/1998 | Gubser |
| 5,873,091 A | 2/1999 | Garth et al. |
| 5,918,225 A | 6/1999 | White et al. |

(Continued)

FOREIGN PATENT DOCUMENTS

| | | |
|---|---|---|
| WO | WO 99/48018 | 9/1999 |
| WO | WO 03/105489 | 12/2003 |
| WO | WO 2008/016877 | 2/2008 |

OTHER PUBLICATIONS

Abadi, Column Stores for Wide and Sparse Data, In Proceedings of the $3^{rd}$ Biennial Conference on Innovative Database Research (CIDR), 2007, pp. 292-297.

(Continued)

*Primary Examiner* — Bruce Moser
(74) *Attorney, Agent, or Firm* — Dentons US LLP

(57) ABSTRACT

In a method for managing metadata in a relational database system using a processor, the metadata is created in a form of rough values corresponding to collections of values, wherein each rough value represents summarized information about values, the values are elements of the corresponding collection of values, and each rough value is substantially smaller than the corresponding collection of values. A collection of values is assigned to a structure dictionary, wherein each of the values represents the value of a row for an attribute and has a unique ordinal number within the collection, and wherein the structure dictionary contains structures defined based on at least one of interaction with a user of the system via an interface, automatic detection of structures occurring in data, and predetermined information about structures relevant to data content that is stored in the system. A match granule is formed, and for each structure in the structure dictionary, a structure granule is formed. Information represented by the match granule and the structure granules is summarized to form a rough value.

27 Claims, 6 Drawing Sheets

(56) References Cited

U.S. PATENT DOCUMENTS

| | | | |
|---|---|---|---|
| 5,938,763 A | 8/1999 | Fimoff et al. |
| 5,946,692 A | 8/1999 | Faloutsos et al. |
| 5,995,957 A | 11/1999 | Beavin et al. |
| 6,012,054 A | 1/2000 | Seputis |
| 6,014,656 A | 1/2000 | Hallmark et al. |
| 6,014,670 A | 1/2000 | Zamanian et al. |
| 6,023,695 A | 2/2000 | Osborn et al. |
| 6,029,163 A | 2/2000 | Ziauddin |
| 6,032,148 A | 2/2000 | Wilkes |
| 6,092,091 A | 7/2000 | Sumita et al. |
| 6,115,708 A | 9/2000 | Fayyad et al. |
| 6,309,424 B1 | 10/2001 | Fallon |
| 6,317,737 B1 | 11/2001 | Gorelik et al. |
| 6,349,310 B1 | 2/2002 | Klein et al. |
| 6,353,826 B1 | 3/2002 | Seputis |
| 6,374,251 B1 | 4/2002 | Fayyad et al. |
| 6,470,330 B1 | 10/2002 | Das et al. |
| 6,477,534 B1 | 11/2002 | Acharya et al. |
| 6,513,041 B2 | 1/2003 | Tarin |
| 6,633,882 B1 | 10/2003 | Fayyad et al. |
| 6,671,772 B1 | 12/2003 | Cousins |
| 6,691,099 B1 | 2/2004 | Mozes |
| 6,754,221 B1 | 6/2004 | Whitcher et al. |
| 6,865,573 B1 | 3/2005 | Hornick et al. |
| 6,973,452 B2 | 12/2005 | Metzger et al. |
| 7,024,414 B2 | 4/2006 | Sah et al. |
| 7,051,038 B1 | 5/2006 | Yeh et al. |
| 7,054,870 B2 | 5/2006 | Holbrook |
| 7,080,081 B2 | 7/2006 | Agarwal et al. |
| 7,154,416 B1 | 12/2006 | Savage |
| 7,174,343 B2 | 2/2007 | Campos et al. |
| 7,243,110 B2 | 7/2007 | Grondin et al. |
| 7,257,571 B2 | 8/2007 | Turski et al. |
| 7,353,218 B2 | 4/2008 | Aggarwal et al. |
| 7,401,104 B2 | 7/2008 | Shah et al. |
| 7,590,641 B1 | 9/2009 | Olson |
| 7,693,339 B2 | 4/2010 | Wittenstein |
| 7,693,857 B2 | 4/2010 | Dettinger et al. |
| 7,693,992 B2 | 4/2010 | Watson |
| 7,747,585 B2 | 6/2010 | Barsness et al. |
| 7,756,889 B2 | 7/2010 | Yu et al. |
| 7,769,728 B2 | 8/2010 | Ivie |
| 2001/0042167 A1 | 11/2001 | Egawa |
| 2002/0007368 A1 | 1/2002 | Lee et al. |
| 2003/0018620 A1* | 1/2003 | Vishnubhotla ............ 707/3 |
| 2003/0028509 A1 | 2/2003 | Sah et al. |
| 2003/0074348 A1 | 4/2003 | Sinclair et al. |
| 2003/0120644 A1 | 6/2003 | Shirota |
| 2004/0039729 A1 | 2/2004 | Boger et al. |
| 2004/0111410 A1 | 6/2004 | Burgoon et al. |
| 2005/0065911 A1 | 3/2005 | Ellis et al. |
| 2005/0102325 A1 | 5/2005 | Gould et al. |
| 2006/0195464 A1 | 8/2006 | Guo |
| 2007/0203925 A1 | 8/2007 | Sandler et al. |
| 2008/0071748 A1 | 3/2008 | Wroblewski et al. |
| 2008/0071818 A1 | 3/2008 | Apanowicz et al. |
| 2008/0219575 A1 | 9/2008 | Wittenstein |
| 2008/0219582 A1 | 9/2008 | Kirenko |
| 2008/0270363 A1 | 10/2008 | Hunt et al. |
| 2009/0043797 A1 | 2/2009 | Dorie et al. |
| 2009/0106210 A1 | 4/2009 | Slezak et al. |

OTHER PUBLICATIONS

Aboulnaga, et al., Automated Statistics Collection in DB2 UDB, Proceedings of the 30th VLDB Conference, 2004, pp. 1158-1169.
Aggarwal, ed., Data Streams: Models and Algorithms, Springer, 2007, 364 pages.
Babu et al., Adaptive Query Processing in the Looking Glass, In Proceedings of the Conference on Innovative Database Research (CIDR), 2005, pp. 238-249.
Bhattacharjee et al., Efficient Query Processing for Multi-Dimensionally Clustered Tables in DB2, Proceedings of the 29th VLDB Conference, 2003, 12 pages.
Bohm et al., Outlier-robust Clustering using Independent Components, SIGMOD Conference '08, 2008, p. 185-198.
Boncz et al., MonetDB/X100: Hyper-Pipelining Query Execution, In Proceedings of the Conference on Innovative Database Research (CIDR), 2005, pp. 225-237.
Bruno et al., To tune or not to Tune? A Lightweight Physical Design Alerter, In Proceedings of the Conference on Very Large Databases (VLDB), 2006, p. 499-510.
Cannataro et al., Knowledge Grid: An Architecture for Distributed Knowledge Discovery, Communications of the ACM, pp. 1-12, 2003, vol. 46, No. 1.
Crochemore et al., On Compact Directed Acyclic Word Graphs, In Structures in Logic and Computer Science, Lecture notes in Computer Science 1261, Springer, 1997, 20 pages.
Crochemore et al., Direct Construction of Compact Directed Acyclic Word Graphs, CPM 1997, 14 pages.
Ester et al., A Database Interface for Clustering in Large Spatial Databases, In Proceedings of the First International Conference on Knowledge Discovery and Data Mining (KDD-95), 1995, 6 pages.
European Search Report dated May 25, 2012 in related European Application No. EP 07815821 filed Sep. 13, 2007, 8 pages.
Fred et al., Data Clustering Using Evidence Accumulation, 16th International Conference on Pattern Recognition, 2002, Proceedings, vol. 4, 5 pages.
Guting, An Introduction to Spatial Database Systems, VLDB Journal, 1994, vol. 3, p. 357-399.
Hellerstein et al., Online Aggregation, SIGMOD Conference, 1997, pp. 1-12.
Hellerstein et al., Interactive Data Analysis: The Control Project, IEEE, 1999, pp. 51-59, vol. 3, No. 8.
Inenaga et al., On-Line Construction of Compact Directed Acyclic Word Graphs, In Proc. of $12^{th}$ Ann. Symposium on Combinatorial Pattern Matching, 2001, 12 pages.
Inenaga et al., On-Line Construction of Compact Directed Acyclic Word Graphs, Discrete Applied Mathematics, 2004, pp. 1-36.
Infobright Analytic Data Warehouse Technology White Paper, Jun. 2008, p. 1-15.
Inmon, Information Lifecycle Management for Data Warehousing: Matching Technology to Reality—An Introduction to SAND Searchable Archive, White Paper, 2005, 17 pages.
Jain et al., Data Clustering: A Review, ACM Computing Surveys, 1999, pp. 264-323, vol. 31, No. 3.
Kriegel et al., Potentials for Improving Query Processing in Spatial Database Systems, Institute for Computer Science, Germany, 1993, p. 1-21.
Larsson, Extended Application of Suffix Trees to Data Compression, Data Compression Conference (DCC),1996, 10 pages.
MacNicol et al., Sybase IQ Multiplex—Designed for Analytics, In Proc. of $30^{th}$ VLDB Conference, 2004, pp. 1227-1230.
Markl et al., Consistent selectivity estimation via maximum entropy, VLDB J., 2007, pp. 55-76, vol. 16, No. 1.
MySQL, Enterprise Data Warehousing with MySQL, A MySQL Business White Paper, 2007, pp. 1-17.
MySQL, 5.1 Reference Manual: Storage Engines, downloaded from the internet at http://devl.mysql.com/doc/refman/5.l/en/storage-engines.html, downloaded Nov. 28, 2007, 196 pages.
Padmanabhan et al., Multi-Dimensional Clustering: A New Data Layout Scheme in DB2, SIGMOD Conference, 2003, p. 637-641.
Pawlak et al., Rudiments of rough sets, Information Sciences, 2007, pp. 3-27, vol. 177, No. 1.
Peters et al., A Dynamic Approach to Rough Clustering, RSCTC 2008, LNAI 5306, Springer-Verlag, 2008, p. 379-388.
QD Technology, The Quick Response Database by QD Technology, A Smart Relational Database Management Solution that Enables Easy and Fast Ad Hoc Queries, White Paper, 2007, 19 pages.
Salomon, Data Compression, $3^{rd}$ Edition, Springer-Verlag, 2004, Ch. 2.18, pp. 134-156.
Sayood, Introduction to Data Compression, $3^{rd}$ Edition, Morgan Kaufmann, 2005, Ch. 6.3, pp. 143-152.
Shkarin, PPM: One Step to Practicality, Data Compression Conference, IEEE Computer Society, Washington DC, 2002, 10 pages.

Slezak et al., Brighthouse: An Analytic Data Warehouse for Ad-Hoc Queries, VLDB '08, Aug. 2008, 9 pages.
Stonebraker et al., C-Store: A Column Oriented DBMS, In Proc. Of the Conf. on Very Large Databases, 2005, 12 pages.
Stonebraker et al., One Size Fits All?—Part 2: Benchmarking Results, In Proc. of the Conf. on Innovative Database Res., 2007, 12 pages.
Vertica, The Vertica Database, Technical Overview White Paper, 2006, 10 pages.
Zhang et al., BIRCH: An Efficient Data Clustering Method for Very Large Databases, SIGMOD '96, 1996, p. 103-114.

\* cited by examiner

SYSTEM AND METHOD FOR MANAGING METADATA IN A RELATIONAL DATABASE

CROSS REFERENCE TO RELATED APPLICATIONS

The present application claims the benefit of U.S. Provisional Application Ser. No. 61/354,686 filed Jun. 14, 2010; which is incorporated herein by reference in its entirety.

FIELD OF THE INVENTION

The present disclosure provides a method and system for optimizing data storage and representation and optimizing and executing queries using string attributes in an RDBMS framework and without the need for complicated data schemas.

BACKGROUND

Over the last decade, the amounts of data and the types of information required from data have substantially increased. This change has been pervasive and universal, affecting everything from basic financial management to understanding and controlling the behavior of large networks of organizations. The use of the World Wide Web, online channels, mobile devices and the worldwide networks that support and process data now offers and creates an enormous opportunity for business analysis and insight. The requirements of businesses and individuals to access, harness and manipulate data are growing as well. Current methods of accessing data are prohibitively expensive, requiring substantial hardware infrastructure, human resources and domain expertise. Further, data is usually tied to a particular means or method of access, which often prevents ad hoc analysis and query formulation on structured or semi-structured data. These challenges require an analysis of the separate concerns of the providers of data and the users of data. This semantic divide results in the often difficult task of integrating several levels of abstraction with the conceptually simple task of storing and retrieving data.

A typical data warehouse today is a compound system, requiring expertise at the levels of application, logical and physical design. The larger the data set, the larger the overhead of managing each of these layers. Often, managing this complexity requires simplifying the interfaces between these various layers. This can lead to a loss of fidelity in the interfaces between the different constituents. For example, data providers and users often have significant domain expertise that is not easily translated into the logical, application and physical data models. There is, therefore, a need for interfaces that enable the injection of the knowledge about data content directly to the database engine, but with no changes to data schemas. Moreover, such interfaces should be designed for the purpose of domain experts rather than database experts, as the knowledge about data content specifics is usually tightly related to the application model but is quite independent from general expertise in databases.

SUMMARY

The present disclosure provides a method and system for optimizing data storage and representation and optimizing and executing queries using string attributes in an RDBMS framework and without the need for complicated data schemas. The present disclosure also provides a method and system for handling values of string attribute data that is transparent to an end user, while providing a rich interface for creating "smart" or "intelligent" data types. The present disclosure also provides a method and system for injecting domain specific information into a database, including at the attribute specification level, and including simplification of existing interfaces, increased query performance, and more efficient storage for data access and compression. Furthermore, the knowledge about data content may be taken into account within the framework of an exemplary database engine. Providing such knowledge inside the database solution significantly influences and improves the data storage and data processing capabilities.

The present disclosure provides a method of managing metadata in a relational database system using a processor, the metadata created in a form of rough values corresponding to collections of values, each rough value being substantially smaller than the corresponding collection of values, the method comprising assigning a collection of values to a structure dictionary, wherein each of the values represents the value of a row for an attribute and has a unique ordinal number within the collection, and wherein the structure dictionary contains structures defined based on at least one of interaction with a user of the system via an interface, automatic detection of structures occurring in data, and predetermined information about structures relevant to data content that is stored in the system, forming match granules, gathering information about how values match the structures in the structure dictionary, for each structure in the structure dictionary, forming structure granules, gathering information about the values in the collection that match the structure, and forming a rough value out of the match granules and the structure granules.

In another embodiment, the method further comprises at least one of inserting, updating and deleting values from a collection of values, and where the rough value corresponding to the collection of values has been modified by the at least one of inserting, updating and deleting values, at least one of immediately re-forming the rough value to reflect the modification, maintaining the rough value in its previous form but with additional information, including which of its components are not up-to-date with respect to the new content of the collection, and what is the degree of inexactness of not up-to-date components of said rough value, evaluating whether the rough value should be re-formed based on a group of criteria including at least one of minimizing the cost of re-forming not up-to-date components of the rough value, minimizing the degree of inexactness of not up-to-date components of the rough value, and maximizing the estimated efficiency of using the rough value while resolving queries, the rough value being accessible independently from the collection of values, the rough value being applied to minimize the amount of accesses to the collection of values while resolving queries, and provided an interface to a user of the system, the interface reporting the cost of re-forming the rough value, the degree of inexactness of not up-to-date components of the rough value, and the estimated efficiency of using the rough value while resolving queries, the rough value being accessible independently from the collection of values, the rough value being applied to minimize the amount of accesses to the collection of values while resolving queries, and the user being able to decide whether and when the components of the rough value should be re-formed.

In another embodiment, the evaluating is based on heuristic optimization algorithms including at least one of greedy, randomized, and AI-based algorithms. In a further embodiment, the structure dictionary is modifiable and the methods of modifying the structure dictionary include at least one of automatically detecting structures occurring in data, automatically adding detected structures to the structure dictionary or recommending said detected structures to a user of the system via an interface, wherein the user determined whether to add the detected structures to the structure dictionary, evaluating the candidate structures based on a group of criteria including at least one of minimizing the number of structures, minimizing the amounts of values not matching any of the structures, minimizing the cost of creating the structure granules corresponding to the structures, and maximizing the estimated efficiency of using the structure granules while resolving queries, wherein the structure granules are accessible independently from sub-collections of values matching the structures, and wherein the structure granules are applied to minimize the amount of accesses to the sub-collections of values matching the corresponding structures while resolving queries, and providing an interface to a user of the system, the interface reporting the amounts of values matched by particular structures, the cost of creating the structure granules corresponding to the structures, and the estimated efficiency of using the structure granules while resolving queries, wherein the structure granules are accessible independently from sub-collections of values matching the structures, wherein the structure granules are applied to minimize the amount of accesses to the sub-collections of values matching the corresponding structures while resolving queries, and wherein the user is able to remove the structures from the structure dictionary and add the structures to the structure dictionary. In yet another embodiment, the method further comprises at least one of adding structures into and modifying the structures in the structure dictionary, and at least one of immediately re-forming the rough values to reflect the at least one of the addition and modification, applying the at least one addition and modification to rough values corresponding to collections of values with new values inserted, or old values deleted or updated after said modification occurred, but not to already existing rough values, evaluating whether said addition or modification should be applied to re-form the already existing rough values based on a group of criteria including at least one of minimizing the cost of forming the structure granules corresponding to the added or modified structures and maximizing the estimated efficiency of using rough values while resolving queries, wherein the rough values are accessible independently from their corresponding collections of values, and the rough values are applied to minimize the amount of accesses to said corresponding collections of values while resolving queries, and providing an interface to a user of the system, said interface reporting the cost of forming the structure granules corresponding to the added or modified structures and the estimated efficiency of using rough values while resolving queries, wherein the rough values are accessible independently from their corresponding collections of values, said rough values are applied to minimize the amount of accesses to said corresponding collections of values while resolving queries, and said user is able to decide whether the modified structure dictionary should be applied to re-form rough values.

In another embodiment, the methods of forming the match granules include at least one of the match granules include information as to whether all values in the corresponding collections of values are matched by at least one of the structures in the structure dictionary, and the match granules include the lists of structures in the structure dictionary that are matched by at least one of the values in the corresponding collections of values.

In a further embodiment, the values can be matched by structures in the structure dictionary in a partial way and the methods of forming the match granules include gathering information about the degrees of partial matching of said values by said structures. In another embodiment, the methods of forming the structure granules corresponding to sub-collections of values matching one of structures in the structure dictionary include at least one of deriving a minimum value and a maximum value of each structure granule, wherein there is an order to a set of values of said structure and each structure granule corresponding to said structure includes the minimum and the maximum values in said sub-collection, and wherein said minimum and said maximum are derived according to said order, taking ordinal numbers from a list of possible values, wherein there is an ordered list of possible values of said structure and each structure granule corresponding to said structure includes information about ordinal numbers of values in said sub-collection, evaluating the candidate methods of forming structure granules based on a group of criteria including at least one of minimizing the cost of creating the structure granules according to said candidate methods and maximizing the estimated efficiency of using structure granules created according to said candidate methods while resolving queries, wherein said structure granules are accessible independently from sub-collections of values matching said structures, and said structure granules are applied to minimize the amount of accesses to said sub-collections of values matching said corresponding structures while resolving queries, and providing an interface to a user of the relational database system, said interface reporting the cost of creating the structure granules according to said candidate methods and the estimated efficiency of using structure granules created according to said candidate methods while resolving queries, wherein said structure granules are accessible independently from sub-collections of values matching said structures, said structure granules are applied to minimize the amount of accesses to said sub-collections of values matching said corresponding structures while resolving queries, and said user is able to add and remove the methods of forming the structure granules.

In another embodiment, a structure in the structure dictionary takes a form of a word built using an alphabet of symbols taking a form of constants corresponding to at least one of alpha-numeric strings and characters, and variables corresponding to at least one generic data type, said word being built using formation rules of a formal language. In yet another embodiment, the generic data type is at least one of numeric, alpha-numeric and binary. In a further embodiment, the language is a recursively enumerable language.

In another embodiment, a word in the structure dictionary is modifiable and methods of modifying said word include at least one of detecting symbols in the word that can be replaced by more detailed sub-words, automatically adding new words obtained by replacing the symbols in the structure dictionary by the sub-words, or recommending the new word to a user of the system via an interface, the user deciding whether to add the new word to structure dictionary and whether said word should remain in the structure dictionary, evaluating the candidate word modifications based on a group of criteria including at least one of minimizing the number of symbols that said word modifications are formed from and maximizing the estimated efficiency of using the structure granules while resolving queries, said structures being represented by said word modifications, said structure granules being accessible independently from sub-collections of values matching said word modifications, said structure granules being applied to minimize the amount of accesses to sub-collections of the values' portions matching symbols that said word modifications are formed from while resolving queries, and providing an interface to a user of the system, said interface reporting the number of symbols that the candidate word modifications are formed from and the estimated efficiency of using the structure granules while resolving queries, said structures being represented by said word modifications, said structure granules being accessible independently from sub-collections of values matching said word modifications, said structure granules being applied to minimize the amount of accesses to sub-collections of the portion of the values matching symbols from which said word modifications are formed while resolving queries, said user being able to decide whether said word modifications should be added to the structure dictionary.

In a further embodiment, the methods of forming the structure granules corresponding to a word in the structure dictionary are preceded by at least one of the following: assigning an ordered list of possible values to at least one of the symbols from which said word is formed and for each said symbol and each value matching said word modifying said value by replacing its portions corresponding to said symbol with their ordinal numbers, wherein said ordinal numbers are taken from said list of possible values, and wherein said list of possible values is a component of any further formed structure granules gathering information about the sub-collection of such modified words, and for at least one of the symbols corresponding to an alpha-numeric data type, identifying the maximum common prefix of all values' portions matching said symbol, and for each said symbol and each value matching said word, modifying said value by removing said maximum common prefix from its portions corresponding to said symbol, said maximum common prefix being a component of any further formed structure granules gathering information about the sub-collection of such modified words.

In another embodiment, the method of forming the structure granules for sub-collections of values matching a word in the structure dictionary comprises for each sub-collection of values matching said word, for each of symbols that said word is formed from, selecting one or more of the methods of forming the symbol granules corresponding to said symbols, said symbol granules gathering information about said portions of the values corresponding to said symbols, and forming said structure granules out of the sets of said obtained symbol granules.

In another embodiment, the methods of forming the symbol granules for the symbols from which the word in the structure dictionary is formed include at least one of deriving a minimum value and a maximum value of each structure granule, wherein there is an order to a set of values of said structure and each structure granule corresponding to said structure includes the minimum and the maximum values in said sub-collection, and wherein said minimum and said maximum are derived according to said order, taking ordinal numbers from a list of possible values, wherein there is an ordered list of possible values of a symbol and the symbol granules corresponding to said symbol include information about distinct ordinal numbers of the values' portions corresponding to said symbol, evaluating the candidate methods of forming the symbol granules based on a group of criteria including at least one of minimizing the cost of creating the symbol granules according to said candidate methods and maximizing the estimated efficiency of using symbol granules created according to said candidate methods while resolving queries, wherein said symbol granules are accessible independently from sub-collections of values' portions matching said symbols, and said symbol granules are applied to minimize the amount of accesses to said sub-collections of values' portions matching said corresponding symbols while resolving queries, and providing an interface to a user of the system, said interface reporting the cost of creating the symbol granules according to said candidate methods and the estimated efficiency of using symbol granules created according to said candidate methods while resolving queries, wherein said symbol granules are accessible independently from sub-collections of values' portions matching said symbols, said symbol granules are applied to minimize the amount of accesses to said sub-collections of values' portions matching said corresponding symbols while resolving queries, and said user is able to add and remove the methods of forming the symbol granules.

In a further embodiment, the method of forming the symbol granule corresponding to a symbol from which a word in the structure dictionary is formed comprises assigning the collection of portions of the values corresponding to said symbol with a sub-structure dictionary containing sub-structures defined based on at least one of: interaction with a user of the system, wherein the algorithms automatically detect sub-structures occurring among said portions of the values corresponding to said symbol, or predefined information about sub-structures relevant to said values' portions corresponding to said symbol, forming the sub-match granule by gathering information how the portions of the values corresponding to said symbol match said sub-structures, forming the sub-structure by granules gathering information about the portions of the values corresponding to said symbol that match particular sub-structures, and forming said symbol granule out of said sub-match granule and said sub-structure granules.

In another embodiment, the method of forming the structure granule corresponding to a word in the structure dictionary comprises selecting the set of sub-words of said word based on at least one of interaction with a user of the system and the algorithms automatically evaluating said candidate sub-words, and forming said structure granule out of the sub-word granules, wherein each of said sub-word granules is formed as corresponding to said selected sub-words or said word. In a further embodiment, there are groupings of data rows and each collection of values contains the values of a single data attribute for a single said grouping of data rows, collections of values corresponding to the same attribute being assigned with the same structure dictionary and the same methods of forming the match granules and structure granules.

In another embodiment, scenarios for groupings of data rows include at least one of each of said groupings contains a single data row, there is a single grouping containing all data rows, each of said groupings contains 65,536 data rows, some of said groupings contain different amounts of rows, heuristic optimization algorithms including at least one of: greedy, randomized, and AI-based algorithms, the algorithms evaluating the candidate groupings of data rows based on minimizing the number of collections of values corresponding to the same attributes that include outliers with respect to structures assigned to such attributes, heuristic optimization algorithms including at least one of: greedy, randomized, and AI-based, the algorithms evaluating the candidate groupings of data rows based on a group of criteria including at least one of minimizing the number of distinct structures in collections of values and maximizing the differences between the structure granules corresponding to different collections of values corresponding to the same attributes, and for at least two attributes in a relational data schema, structures in the structure dictionary being assigned to at least one of the two attributes describing semantic relationships of at least two of its values with at least one of the values of the other attribute, heuristic optimization algorithms including at least one of:

greedy, randomized, and AI-based algorithms, the algorithms evaluating the candidate groupings of data rows based on at least one of minimizing the number of distinct structures in the collections of values of at least one of the two attributes describing a semantic relationship with the value of other attribute and maximizing the differences between the structure granules corresponding to the collection of values corresponding to the at least one of the two attributes, said structure granules describing the semantic relationship of at least one of its values with at least one of the values of the other attribute.

In a further embodiment, for a data attribute assigned to a structure dictionary, the methods of forming the structure granules include at least one of an order over a set of values of a structure in the structure dictionary and the structure granules corresponding to said structure include the minimum and the maximum among values matching said structure, said minimum and said maximum values being derived according to said order, said order being the same for all collections of values corresponding to said attribute, an ordered list of possible values of a structure in the structure dictionary and the structure granules corresponding to said structure include information about distinct ordinal numbers of values occurring among the values matching said structure, said ordinal numbers being taken from said list of possible values, said list of possible values being the same for all collections of values corresponding to said attribute, said structure takes a form of a word built from an alphabet of symbols taking a form of constants corresponding to alpha-numeric strings and characters, and variables corresponding to generic data types including numeric, alpha-numeric and binary data types, building said word using formation rules of a formal language, representation of said structure as said word being applied to build the structure granules corresponding to said structure in the same way for all collections of values corresponding to said attribute, evaluating the candidate methods of forming the structure granules based on a group of criteria including at least one of minimizing the overall cost of creating the structure granules according to said candidate methods and maximizing the estimated efficiency of using structure granules created according to said candidate methods while resolving queries, wherein said structure granules are accessible independently from collections of values matching said structures, and said structure granules are applied to minimize the amount of accesses to said collections of values matching said corresponding structures while resolving queries, said overall cost and said estimated efficiency being measured for all collections of values corresponding to said attribute, and providing an interface to a user of the system, said interface reporting the overall cost of creating the structure granules according to said candidate methods and the estimated efficiency of using structure granules created according to said candidate methods while resolving queries, wherein said structure granules are accessible independently from collections of values matching said structures, said structure granules are applied to minimize the amount of accesses to said collections of values matching said corresponding structures while resolving queries, said user is able to add new and remove old methods of forming structure granules, said user's decisions affecting all collections of values corresponding to said attribute.

In another embodiment, the formal language is recursively enumerable language. In yet another embodiment, for a data attribute assigned to a structure dictionary, each collection of values corresponding to the data attribute is assigned by a decomposition rule with a subset of structures in the structure dictionary, by providing a first interface to a user of the system, said first interface enabling the user to define and add new structures to the structure dictionary, providing a second interface to a user of the system, said second interface enabling the user to change the decomposition rule to be used for new collections of values corresponding to the data attribute, storing information about the current and all previous decomposition rules together with information about which collections of values correspond to each of the decomposition rules, and for each collection of values, composing its rough values according to the subset of structures that the decomposition rule assigns to the corresponding collection of values.

DETAILED DESCRIPTION

Figure 1:
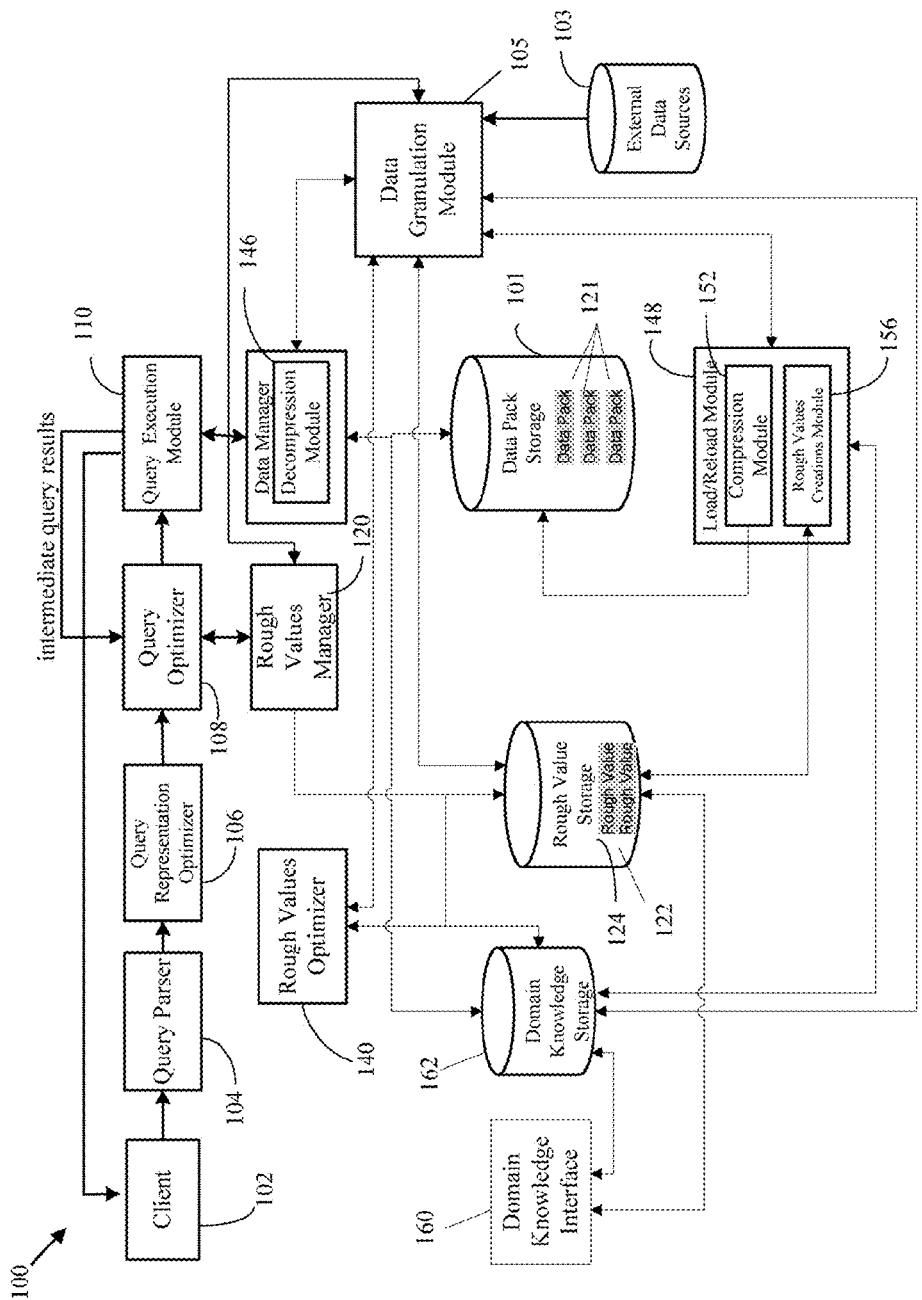
FIG. 1 illustrates a processing arrangement of an exemplary embodiment.

Relational databases, along with standard SQL (Structured Query Language), provide a useful and popular framework for storing and querying data. An important trend in database industry relates to analytical engines that are optimized for advanced reporting and ad hoc querying. Such engines are usually applied at the level of data marts, especially in market segments where rapid data growth is expected. Originally, they have been technically complex and difficult to maintain. However, they have evolved toward solutions capable of handling tens of terabytes of data on a single off-the-shelf box. The current invention is aimed at improving such analytic database engines by means of better data compression and faster SQL performance. Referring to FIG. 1, a processing arrangement 100 for carrying out an embodiment of the current invention will be described. Processing arrangement 100 is described with reference to functional program modules for the purpose of illustration only. When implemented, one or more of these functional modules may be combined into a single program module or may include two or more sub-modules. Some of the presented modules are described in U.S. Patent Publication Nos. 2008/0071818, 2008/0071748, and 2009/0106210, all of which are incorporated herein by reference in their entireties. Domain Knowledge Interface module 160 and Domain Knowledge Storage module 162, as well as their interactions with other modules are related specifically to the current invention.

Processing arrangement 100 may interface with a client application (also referred to as a client) 102 providing a query tool executed on a user terminal (not shown). Processing arrangement 100 may be coupled to a data pack storage 101, which may be implemented using SQL, and may provide an interface, such as an SQL interface, to query tools for use via the client application 102. The SQL interface may manage the creation and management of database objects like tables, views and user permissions to those tables. Although only one client application 102 is shown, multiple client applications 102 may be connected to the processing arrangement 100. The client application 102 may provide a user interface (not shown) through which SQL requests and responses may be sent and received between the client application 102 and the processing arrangement 100. Processing arrangement 100 may include, for example, a query parser 104, a query representation optimizer 106, a query optimizer 108 and a query execution module 110.

Processing arrangement 100 may also include functional program modules such as: connectors, connection pool, management services and utilities, caches and buffers, a file system, and the like. The functionality of these program modules will be understood by a person of ordinary skill in the art and so will only be briefly described. The connectors may provide various mechanisms/protocols for external tools to connect to the database. The connection pool may manage multiple clients connecting and making requests to the database. The connection pool may manage the concurrency of many requests competing for resources. The management services and utilities are supporting tools that may be used with the data to manage administration, settings, users, and the like. The caches and buffers are lower level services that may be provided to all the system components which manage data in memory (e.g., Random Access Memory (RAM)) for query responses and optimizations among other functions. The file system may manage the storage device.

During or prior to query execution, data rows received from external data sources 103 may be optionally grouped by data granulation module 105. During a granulation operation, for example, data granulation module 105 may receive a data stream from external data sources 103. Alternatively, during a second or other subsequent operation, data granulation module 105 may receive a data from decompression module 146. In performing a data granulation operation, data granulation module 105, interacts with rough value storage 124 and rough values manager 120. For example rough value storage 124 may provide data granulation module 105 with information about rough value weighting factors. Moreover data granulation module 105 may optimize a granulation operation based on rough value information provided by rough values manager 120.

For the purposes of the current invention, we may assume that the rows received from external data sources are grouped using some heuristic algorithms or not, which means that the occurrence of their content in data pack storage 101 is according to the physical flow of data from external sources. Grouped data rows are then outputted by data granulation module 105 to load/reload module 148. Load/reload module 148 may perform compression, file storage, and computation of rough values, and may output the results of these steps to data pack storage 101.

Data pack storage 101 may include one or more data packs 121. In some embodiments, data pack storage 101 may store a columnar database, and the data packs 121 may each represent attribute data from a base table. The data packs 121 may include compressed data representing the values of rows in the respective attribute. Data pack storage 101 may provide for partitioning on one or more data storage devices (not shown) such as a hard disk drive (HDD) or other suitable storage medium, which may be a permanent (i.e., non-volatile) storage medium. Depending on the size of an attribute, the attribute data may be stored in more than one data pack. The data packs 121 may contain more or less values of rows than discussed here, depending on the application.

Information about data elements in a data pack 121, such as basic statistical or analytical information, may be stored as a rough value 122 associated with each data pack 121 in the rough value storage 124. In some embodiments, there may be one rough value 122 for each data pack 121. Each rough value 122 may contain basic information (e.g., statistics) about some aspects of its respective data pack 121. The particular information maintained in rough value 122 for each data pack 121 may depend on the particular type of data within the respective data pack 121 (e.g., on whether the data consists of strings, numeric values, floating point values or binary values). Typically, the size of each rough value 122 may be small and so the rough value 122 may not be compressed. However, if the information contained in rough value 122 becomes more compound or large, rough value 122 may be compressed.

As an example, rough values 122 for data packs 121 may include: the number of non-null values for at least one attribute in the respective data pack 121, the minimum and maximum values for at least one attribute in the respective data pack 121, and the sum of values for at least one attribute in the respective data pack 121. In the case of string attributes, the lexicographic minimum and maximum or the largest common prefix (e.g., the longest sub-string that is common to all strings) for a data pack 121 may be stored. If all non-null values for an attribute in the data pack 121 are the same, the rough value 122 corresponding to that attribute may store only statistical information, in which case only the position of nulls may be stored in a file for that attribute within the data pack. In some embodiments, additional or different information may be included in the rough value 122. Further, other information about the respective data pack 121 may be derived from the information in the rough value 122. For example, the average value may be derived directly from the number of non-null values and the sum of values which are both stored in the rough value 122.

As previously discussed, rough value 122 may be used in query planning and execution, and may allow minimization of the need to access the data stored in the respective data pack 121 during query execution, as will be described in more detail below. Rough values may also be used for optimized scheduling of data access by, for example, optimizing the usage of memory buffers, processing the data in a way so as to find query resolution faster, and the like.

The processing arrangement 100 may further include a rough value manager 120 and a rough value optimizer 140. The rough value manager 120 may be a functional program module that may manage the rough values 122. The rough value manager 120 works with the query optimizer 108 and rough value optimizer 140. The rough value manager 120 may generate, modify and remove rough values 122 based on instructions from the rough value optimizer 140. The rough value manager 120 may also be responsible for informing the query optimizer 108 about the available rough values 122 and may load them into memory from storage (e.g., HDD) as necessary. When loaded into memory, the query optimizer 108 may use information from the rough values 122 to determine the optimum query execution plan. Once loaded into memory the rough values 122 may also be used in the execution of the query execution plan as will be explained in more detail below.

The rough value optimizer 140 may be a functional program module that may be used to determine an optimum set of rough values 122 based on rough value usage and quality statistics 142 obtained from the rough value manager 120.

Rough value usage and quality statistics 142 may store information about the frequency and/or kind of usage of rough values 122 and data packs 121 by query optimizer 108 and query execution module 110. Data pack usage statistics may influence compression/speed ratios for particular data packs 121 and influence which data packs 121 are loaded directly into memory. Rough value usage and quality statistics 142 may also be used to vary the content of the rough values 122 for particular data packs 121. Moreover, rough value usage and quality statistics 142 may be used to characterize the respective data packs 121 of the data being queried.

Using the rough value usage and quality statistics 142, the rough value optimizer 140 may update the optimal set of rough values 122. If rough values 122 do not exist over a desired data range, the rough value optimizer 140 may determine that creation of one or more rough values 122 would improve query execution. In this case, the rough value optimizer 140 may instruct the rough value manager 120 to create one or more rough values 122 of a given type. If rough values 122 exist over a desired data range (e.g., for a given data pack 121) but, for example, the rough values 122 cannot be used to answer the most frequent queries over this range, the existing rough values 122 may be modified or new rough values 122 may be created in order to provide sufficient statistics to satisfy such queries. In this case, the rough value optimizer 140 may instruct the rough value manager 120 to modify or create the relevant rough values 122. If rough values 122 exist, but the relevant data is infrequently or never queried, and hence the relevant rough value 122 is infrequently or never queried, these rough values 122 may be deleted. In this case, the rough value optimizer 140 may instruct the rough value manager 120 to delete the relevant rough values 122. If such data becomes accessed or queried more frequently in the future, this may be detected by the rough value optimizer 140, which may instruct the rough value manager 120 to start (re)creating relevant rough values 122 if doing so will improve query performance.

Domain knowledge storage 162 stores definitions of structures of values of string attributes that may be detected and maintained automatically or provided by data providers and domain experts. Domain knowledge storage 162 may contain both universal structures (semantic templates, patterns) that are useful in a wider range of applications in a given real-life domain, as well as more specific rules for particular attributes in particular data tables or even for specific data packs of those attributes. Structures and rules stored in domain knowledge storage 162 influence the work of data granulation module 105, e.g. by means of optimizing the contents of particular rough rows in order to avoid too many heterogeneous structures in the same data packs, the work of load/reload module 148 including its compression module 152 and rough values creation module 156 components, by setting up the rules of decomposing original collections of values into sub-collections of their semantic particles and the corresponding statistics, as well as the work of rough values optimizer 140 by providing the space of various possible rough value types that follow the hierarchies described by semantic structures and rules.

Domain knowledge storage 162 is closely connected with domain knowledge interface 160, which provides the means for data providers and domain experts to define both the general semantic structures and more specific rules. Domain knowledge storage 162 may also store statistics related to the efficiency of applying the structures and rules to particular attributes (e.g., by monitoring the percentage of values that did not match the given structures and rules). Such statistics may be then provided to data providers and domain experts via domain knowledge interface 160, in order to seek for feedback in better defining and assigning structures and rules.

Query parser 104 may receive SQL queries, sometimes referred to as requests or SQL statements, from client application 102. Query parser 104 parses or separates the SQL query received from the client application 102 and converts it into an internal representation usable by the processing arrangement 100. Query parser 104 may forward this internal representation to query representation optimizer 106.

Query representation optimizer 106 may perform a syntactical optimization of the query. Query representation optimizer 106 replaces any references to views with references to the underlying base tables and reformats the query to attempt to make it easier to execute based on the structure of the query request. Query representation optimizer 106 may forward this optimized representation to the query optimizer 108.

Query optimizer 108 may optimize the query for execution using analytical information from the rough values 122 relating to the underlying data (e.g., attribute, table, or view described in the original SQL query) provided via the rough value manager 120, and from intermediate query results obtained from the query execution module 110 as will be described in more detail below. The query optimizer 108 may prepare the query for execution by preparing a query execution plan. If intermediate query results are obtained from the query execution module 110, the query optimizer 108 may modify the initial query execution plan based on these intermediate results. The query optimizer 108 may forward the initial and any modified query execution plans to the query execution module 110 for execution.

Query execution module 110 may execute the initial and any modified query execution plans provided by query optimizer 108. Query execution module 110 may also be coupled to the rough value manager 120 so as to provide access to the analytical information of the rough values 122 for use in answering the query. Query execution module 110 may, if the query cannot be resolved solely from the basic and/or advanced analytical information in the rough values 122, use retrieved data from storage (e.g., HDD) by decompressing the relevant data packs 121 in the data pack storage 101 using a decompression module 146. A file system (not shown) may be responsible for storing and retrieving data from data packs 121 in storage and compressing or decompressing the data packs 121 as required.

The processing arrangement 100 may further include load/reload module 148. Load/reload module 148 may receive data packs 121 from data granulation module 105. As part of the encoding/decoding operation, the data in the data packs 121 may be compressed by the compression module 152 in the load/reload module 148. The load/reload module 148 may also produce rough values by way of rough values creation module 156 in the load/reload module 148.

The database content and metadata may be stored in several types of files: (1) attribute description files; (2) data pack description files; (3) data files; and (4) rough value description files. Attribute description files contain a description of the attribute which may include: its data type, rough value information, and data pack localization.

In some embodiments, there are data pack description files in addition to the attribute description files, in which case the attribute description files may contain information on the data type and basic statistics of the attribute (e.g., information as to whether each row has a unique value, a dictionary of values if an attribute has small number of distinct values, or others), and the data pack description files may contain rough value information.

The data files contain the compressed attribute data. The data files may be stored with the attribute description file, although they may be stored in a different location (e.g., different storage device, etc.). In some aspects, the data files may be limited to 2 GB in size, or some other suitable size depending on the application. When reading data from a data pack 121, the file system may only need to decompress the parts of the data files associated with data elements related to the values of the relevant attribute in the relevant data pack 121.

The rough value description files store information about the rough values 122. Each rough value description file describes a separate rough value 122, allowing individual rough values 122 to be created, modified, or removed by the rough value manager 120 without affecting other objects, such as other rough values 122. This may improve the ability to manage (e.g., by creation or deletion of rough values 122) the rough values 122 of the database 101. The rough value description files may be stored on the same or different storage device (e.g., HDD) as the attribute description files and data files. The rough value description files are loaded into memory on the first use of the rough values 122, however the rough value manager 120 may load and remove rough values 122 from memory in accordance with usage of such rough values 122. The rough value description files are not necessary for data decoding, and may therefore be lost or restored at any time.

The content of the data files may be subject to memory management. Once the attribute metadata (e.g., attribute description files), data pack 121 or rough value 122 is loaded into memory, it may be kept in memory as long as it is being used, and may be kept by the memory manager for future use. When the available memory becomes low, the less used objects may be removed from memory, as managed by the rough value manager 120.

The current methodology may be embedded into a number of RDBMS engines to achieve more compacted data storage and faster data access while performing analytic querying. For example, the usage of domain knowledge about data content may be applicable for better compression and faster decompression of data blocks in Sybase IQ, as described in U.S. Pat. No. 5,794,229. It may also be applicable in the Netezza system as described in U.S. Pat. No. 6,973,452, for replacing zone maps with rough values based on domain knowledge, which would result in its better capability to exclude data portions prior to its main stage of query processing.

Figure 2:
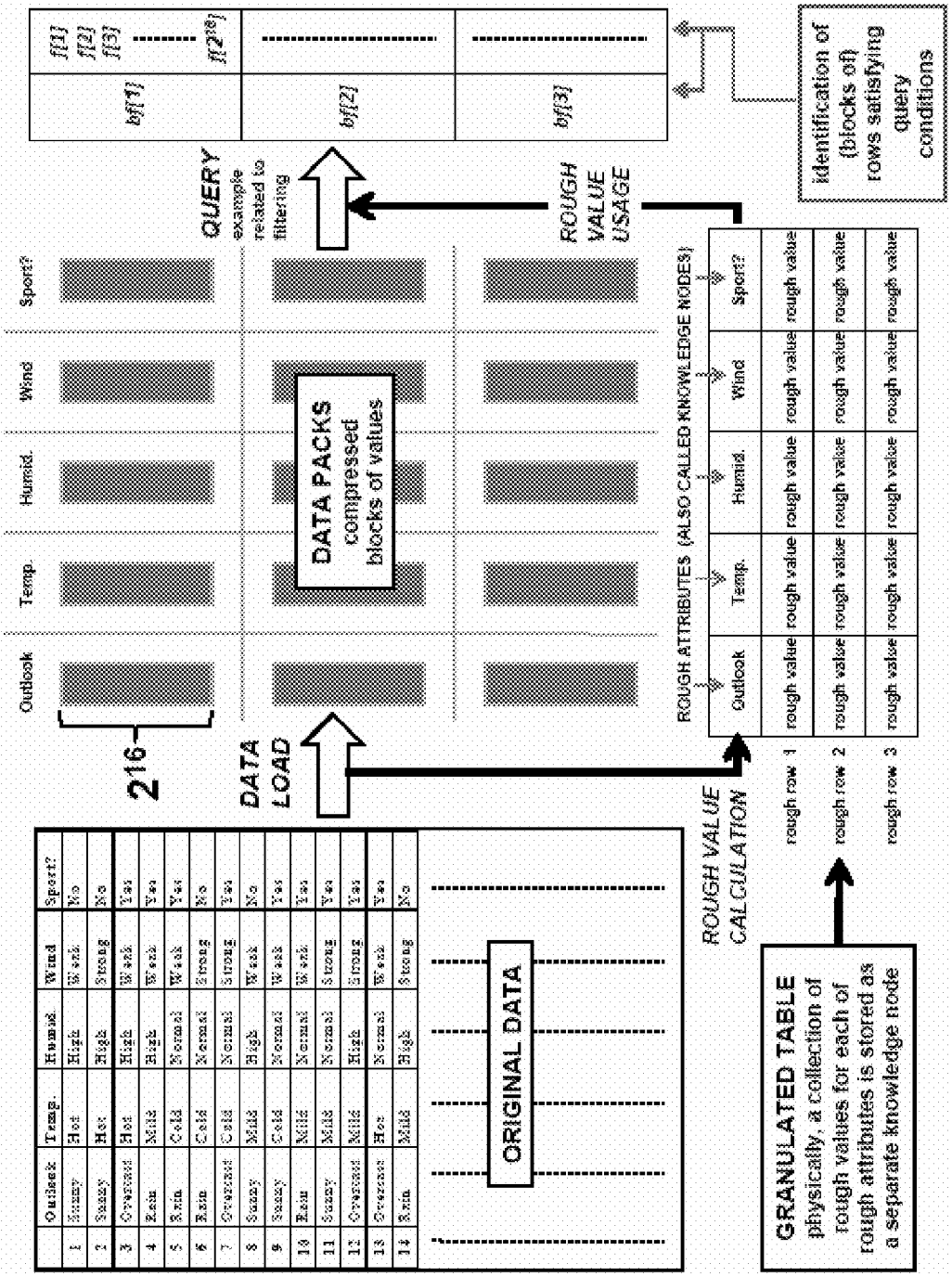
FIG. 2 shows an application of the proposed methodology while querying according to an embodiment of the present disclosure.

The Infobright Community Edition (ICE), open source, and Infobright Enterprise Edition (IEE), commercial, are specific examples of the embodiment of the above-described processing arrangement. In ICE and IEE, standard indices are replaced with much smaller compact information that annotates the groups of rows being created while loading data. A granulated table, with its rows—called rough rows—corresponding to the groups of original rows and with its attributes corresponding to various forms of compact information, is automatically created. Data operations are then designed based on two layers. The first layer includes the granulated tables with rough rows having rough values corresponding to information about particular attributes. The second layer includes the underlying repository of data packs. Data packs store collections of values of particular attributes within particular groups of rows, accessed along the standards of columnar data storage and compressed separately from each other. As shown in FIG. 2, rough values can be used, for example, to exclude data packs that do not satisfy some query conditions without a need of accessing the compressed data packs. Rough rows may correspond to the groups of original rows, where the number of rows in each rough row can be set up arbitrarily (in one of embodiments, it can be, for example, $2^{16}$ original rows) or evolve in time, according to various criteria. Rough values and data packs are stored on disk. Rough values are small enough to keep them at least partially in memory during query sessions. A relatively small fraction of data packs is maintained in memory as well. Data packs are accessed on demand. More details on data pack compression methods, advanced methods of using rough values to minimize data pack access, and arranging rows into rough rows to optimize data compression and efficiency of rough values can be found in U.S. Patent Publication Nos. 2008/0071818, 2008/0071748, and 2009/0106210, respectively.

The speed of data operations depends on the ability of rough values to minimize and optimize access to the actual data stored on disk in the form of compressed data packs, as well as on the ability to identify which data packs should be present in memory. We refer to these capabilities as to the efficiency of rough values. Rough values must provide good means for data access minimization and optimization, and remain of small size to provide for smooth operation. It is also important for data packs to be highly compressed and easy to decompress. High compression and easy decompression can be considered for some other RDBMS platforms as well. Also, rough values that are highly efficient might be analyzed for other databases.

The algorithms for expressing and improving the quality of rough values by more accurate grouping of rows into rough rows can be developed. One of such methods is disclosed in U.S. Patent Publication No. 2009/0106210. However, such methods are insufficient to satisfactorily handle string data attributes that are too difficult to be represented by using the typical rough values because of their compound content. An examination was made of many rough value structures that summarize the collections of long strings, particularly in such applications as online, mobile, or machine-generated data analytics, as well as bio-medical applications, where issues arise with long string attributes that store, for example, URLs, emails, or texts. Various types of rough values were compared with respect to their above-defined efficiency and their size relative to the original data packs. Some of those rough values are further described in U.S. Patent Publication No. 2008/0071748. However, because of the differences in real-life applications, a universal structure providing adequate representation of strings originating from multiple specific kinds of applications is a complicated undertaking. A similar situation was experienced with respect data compression. Powerful algorithms for compressing string data were adopted and extended for use in the current process. However, these algorithms are likely to work better when guided by knowledge about the origin or, in other words, the internal semantics of input values. Two simple examples are as follows:

Consider an example of a data set wherein the rows correspond to patients undertaking various medical tests, with the results of these tests being stored as the values of separate data attributes. Now, imagine that all data attributes are declared as varchars, even though they are actually numbers. The reason is that a small fraction of the tests' results is unknown and the corresponding values take a form of "?," "no_data," or "no_test."

One might claim that such situation should be dealt with at the stage of data cleaning or data modeling. However, there may be reasons for data being stored "unreasonably". A medical data management system may be already designed to handle the attributes as varchar type. Then, rough values describing the string content will be created, although almost 100% of the content is actually numeric and would be handled far more efficiently by rough values designed specifically for collections of numeric values. If we could separate string values from numeric values, then both data compression and efficiency of rough values in the case of numeric values would be far higher. However, we need to foresee that numeric values and string values will be mixed at least to some extent in the same data packs, and that most of end users will be unlikely to accept any changes at the level of attribute type declarations at the schema level.

As another example, consider a weblog data set with an attribute storing URLs. Consider http://www.infobright.com and www.infobright.org that differ mainly by occurrence of non-empty scheme name in the first case (which is http) and a slight difference in their hierarchical parts (org instead of com). String data packs will be then automatically labeled with rough values in form of the longest common prefixes, lexicographic minima and maxima, as well as compacted versions of bitmaps, as described in U.S. Patent Publication No. 2008/0071748. However, such rough values, as well as rough values that would be snapshots of, for example, n-grams or more advanced structures cannot take advantage of the fact that Uniform Resource Identifier (URI) consists of the semantic portions such as scheme name, hierarchical part and the others. On the other hand, a simple semantic encoding of a limited number of distinct scheme names (such as http, https, et cetera) and replacing scheme names by the codes (also representing that a scheme name is missing as a special case) in the original string values would result in far better ability to build meaningful rough values over such modified string values.

Such situations often result in a poor (or rather worse than intuitively expected) set of rough values to assist in data processing. It also affects data compression that might work more efficiently with better semantically isolated portions of the original strings. Achieving good quality of rough values and good compression and decompression characteristics becomes more difficult for more compound types of attributes. Even for such fields as Internet Protocol (IP) address or International Mobile Subscriber Identity (IMSI) numbers that could be easily encoded as integers, it is difficult to determine at what stage of database modeling such encodings should be applied and how they may affect the end users' everyday work if introduced explicitly at the data schema level.

Understanding and encoding what is known about data content provides significant improvement in the efficiency of its storage and processing. For example, knowing that a given data value is a URI, or often "has the look of" a URI can assist in such storage and processing. The domain knowledge about data content may be taken into account in an RDBMS solution. By injecting such knowledge into a database engine, data storage and query processing may be influenced. In order to achieve a system of query processing and automated physical database design that also provides minimized user interface at a configuration level and low storage overhead due to data compression, one needs to acknowledge several following aspects.

The first aspect that helps define the issues for resolution refers to defining interfaces that allow experts to create and modify semantic rules for the data that they will be working with. These rules may be tied to attributes and schema, but they may also simply be general observations about the structure of data that the system may encounter.

Semantics of a given type should be described in a way that is rich enough to be meaningful, yet can be encoded in a manner that will allow its use. The description should be used to match, by explicit or approximate patterns, the type or types of a given string. Once the type is identified, the derived information is applied to create a useful executable specification that can provide useful natural partitions of the data internally, as well as more meaningful snapshots of data content encapsulated by an API between rough values and other components of the system.

Such semantic knowledge may be partially applicable at the stages of data preprocessing, integrating and modeling, for example, introducing the scheme, hierarchical part, query and fragment attributes instead of a single URI attribute. However, such advanced activities usually make the resulting data models too complicated for the end users, who would prefer to focus on querying precisely at the level of original data. They become even less tractable when values of the same attribute follow different structural patterns, for example, not all of them have a form of URI.

The present disclosure also provides an interface that enforces the separation of concerns between the various users and their data. This interface enables users to inject the domain knowledge directly to the database engine, but with no changes to data schemas. In this way, end users of the system are shielded from the complexity of semantic modeling, while reaping most of its benefits. Rather than exposing the physical structures of the database to the experts, which often necessitates many different levels of expertise to understand, design, develop, tune and deploy, an inversion of control provides a direct interface with the two most meaningful users of modern analytic databases: those who understand what the data is, and those who are trying to use that data.

These interfaces are designed for the purpose of domain experts rather than database experts, as the knowledge about data content is usually tightly related to applications but quite independent from general expertise in databases. Other embodiments also provide autonomic, adaptive, artificial intelligence (AI)-based methods that monitor data and queries in order to discover some kind of data content semantics automatically. However, as in the case of advanced machine learning or information retrieval, the key to success is in the interaction between the domain experts and the algorithms of the engine. These interfaces and levels of injecting domain knowledge help establish this type of seamless interaction.

Injected domain knowledge may assist in defining rough values. Generally, one may expect useful rough values and high compression ratios for collections of numbers (for statistics, such as, for example, minima/maxima, which become more powerful and a wider range of compression techniques are applicable) and attributes with low amounts of distinct values (given the possibility of using codes instead of original strings). The challenge is how to take the advantage of such opportunities also for long strings and heterogeneous collections of values. Below a framework for decomposition of collections of strings onto sub-collections that can be described this way is provided. Of course, "perfect" decomposition is not always possible. In one of previous examples, if "?," "no_data," and "no_test" are the only possible truly string values, they can be replaced with their internal codes. However, if there are thousands of these types of values, their more advanced representation would be necessary (in any case, sub-collections of numeric values should be compressed and annotated with statistics separately). In another previous example, the codes are likely to be applied to handling the scheme portions, but for certain scenarios it may be extremely difficult for codes to be applied to handle the hierarchical parts. Nevertheless, the storage and rough value formation can be significantly improved even by following such partially applicable methods, with no changes to the data schema from the perspective of end users.

Additionally, by creating a framework that encodes the entire semantic structure of a given attribute and the corresponding attribute values, automatic pattern matching may be leveraged at various stages of computation (e.g., data compression, query plan, query execution) which combines different levels with the hierarchy of a single attribute or between different semantic particles of the values of that attribute.

The next aspect relates to data access. Given a domain definition, a query and a set of data associations, the query engine operates on values, encoded values and rough values to derive execution plans, as presented, for example, in U.S. Patent Publication No. 2008/0071748. However, the query engine does not need to be aware of the semantic complexity of the data it is working with. Instead, the query engine internally queries the data storage layer by means of standard functionality of rough values. This means that although rough values may become of richer structure internally, their functionality for the query optimization and query execution modules should remain the same as if there was no domain knowledge applied.

When investigating the machine-generated data sets, string attributes often have a heterogeneous nature. This means that the values of the same attribute may match different semantic structures. In such cases, it may be important to group into data packs the values with structures that are often queried together in a given database application. Also, there may be dependencies between the fact of matching particular structures by particular values and accessing those values (e.g., in SQL statements such as joins and correlated subqueries) together with the values of different attributes or attributes belonging to different tables in the database.

Figure 3:
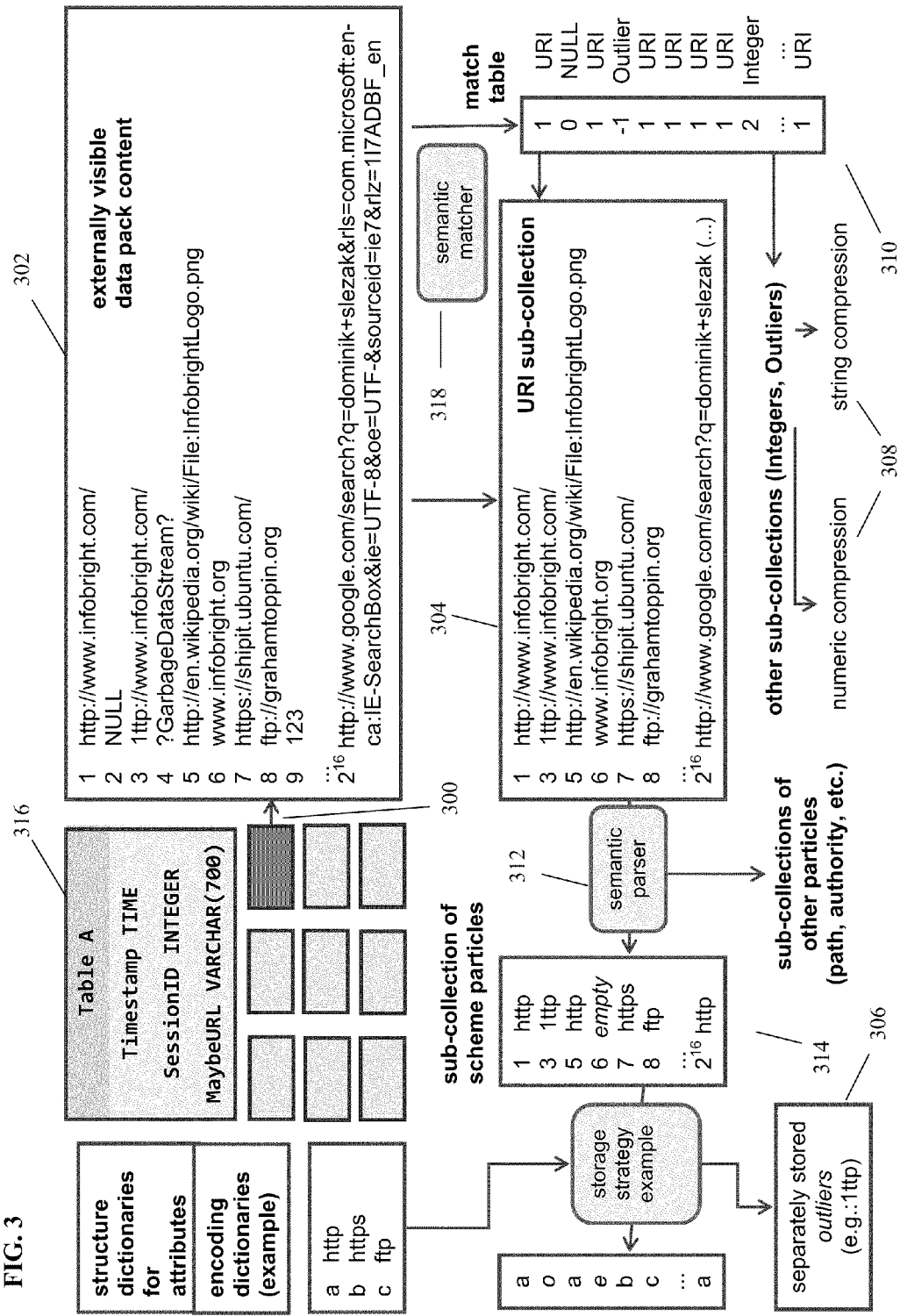
FIG. 3 shows an internal structure (i.e., data pack) for the storage of a collection of values, for example, in an exemplary database engine, according to an embodiment of the present disclosure.

Turning now to FIG. 3, there is shown a data pack 300 related to MaybeURL attribute. The data pack 300 includes certain data pack content 302 that represents externally visible content. Within the collection of values, there are sub-collections of NULLs, integers, strings that can be at least partially parsed along the standard URI structure, the URI sub-collection 304, as well as outliers 306 that do not follow any kind of meaningful structure. Each of such data packs may be delivered as the original string sequence to the query execution modules but, internally, they can be stored in the form of homogeneous sub-collections compressed separately 308. The consistency of a data pack can be secured by its match table 310, which encodes membership of each of values belonging to the collection of values to one of the sub-collections. This is an extension of the previously implemented method of decomposing data packs onto their NULL and not-NULL portions, as described in U.S. Patent Publication No. 2008/0071818, and which can also be applied in various forms in other RDBMS approaches. The difference is that here multiple sub-types of not-NULLs can be processed.

For a given data pack, each of its corresponding sub-collections is potentially easier to compress than when trying to compress all values in the collection together. Each of the sub-collections can be also described by separate, finer statistics that together constitute the pack's rough value available to the execution modules that do not even need to be aware of the pack's internal complexity. Such finer statistics are called as granules or rough particles contained in rough values. Data compression and rough value construction routines can further take into account that particular sub-collections gather values sharing (almost) the same structure. Looking again at FIG. 3, each of the values in the URI sub-collection can be decomposed onto even smaller particles 312, such as scheme, path, authority, and so on. Sub-collections of specific smaller particles can be compressed and summarized even better than sub-collections of not decomposed values. For example, a sub-collection of scheme names 314, can be compressed separately from the others. Again, such decompositions can be maintained as transparent to the query execution modules, which refer to rough values via standard looking functions that hide internal complexity in their implementation and, if necessary, work with data packs as sequences of re-composed, original or encoded values.

In summary, as shown in FIG. 3, information is stored based on the domain knowledge. Data packs are decomposed onto sub-collections of values corresponding to different structures that can be further decomposed along particular structure specifications. This results in sequences of more homogeneous (smaller particles of) values that can be better compressed. For example, in FIG. 3 it is shown how to store the scheme names of URI values.

Figure 4:
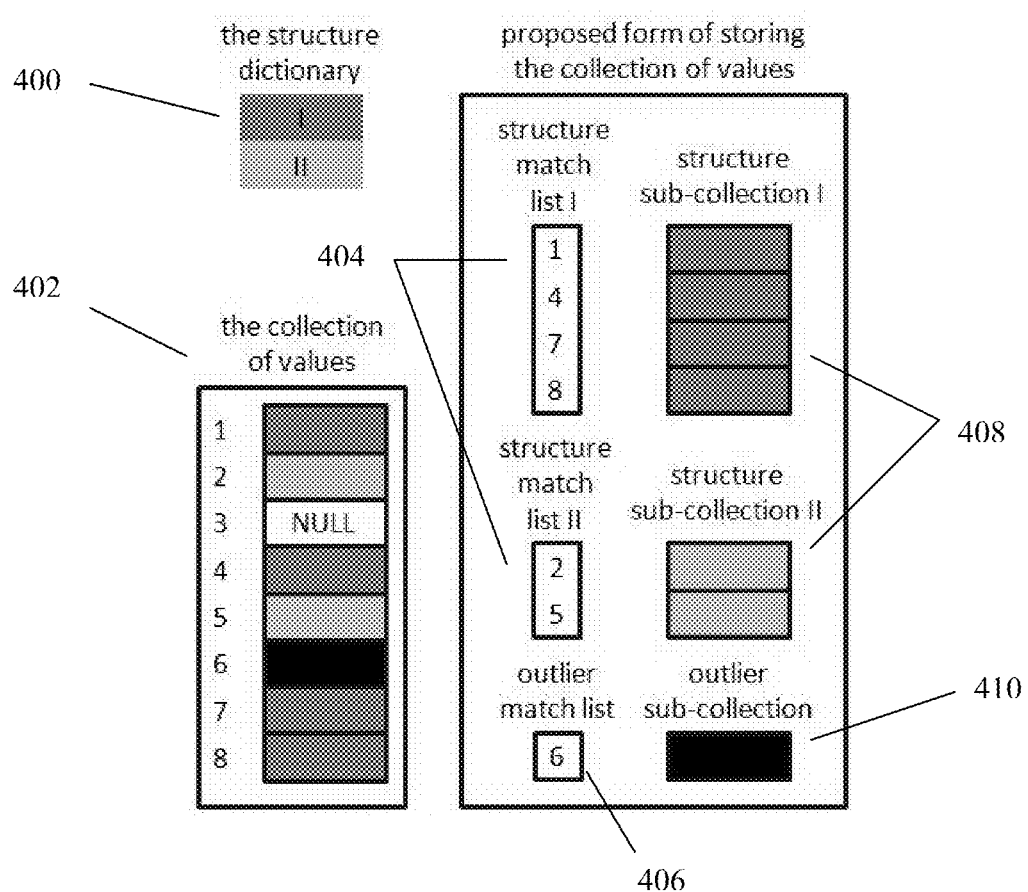
FIG. 4 shows an internal structure (i.e., data pack) for the storage of a collection of values, for example, in an exemplary database engine, according to an embodiment of the present disclosure, with a focus on sub-collections of values sharing different semantic structures.

For each of the semantic particles that are derived based on one of the considered methods, a corresponding structure dictionary may be built. The structure dictionary contains hierarchies of values corresponding to the data that is loaded or associated with particular values. As shown in FIG. 4, from the structure dictionary 400 and the following components, we derive information about the values as follows:

A data pack, as such term is used herein, is defined as a container for storing information about a collection of values. Internally, the structure of a data pack may be compound, for example, it may compress various sub-collections separately or it may store some additional masks, lists or other items. For the purpose of external modules it provides a collection of values that are available as the collection of original values or collection of encoded values that can be used by the query execution modules, or alternatively, the query execution module can ask for a single value (or encoded value) instead of asking for the whole collection. It is the internal task of the data pack to determine how to provide the query modules with what they need. From the perspective of the data processing layers, data packs contain collections of original values 402 for a given attribute and a given group of rows. In some situations, the query engine may actually request the internal codes of the values instead of their original form but the whole framework would remain the same. These techniques of handling data by means of data packs may also be implemented with other database solutions, although factors such as semantic richness and an additional layer related to rough values would need to be implemented.

In summary, the match tables encode matches against whole structures. For example, as shown in Table 1, a match against a URI might have the following encoding scheme:

TABLE 1

| CODE | VALUE |
| --- | --- |
| 1 | URL is matched for the given value |
| 0 | NULL value |
| −1 | value with unrecognized structure |
| 2 | purely numeric value |

Each entry in the match table has a corresponding ordinal number, assigned on load. One may also consider match lists 404 containing the ordinal numbers of those elements in a given collection which match a structure completely. Outlier match lists 406 contain then the ordinal numbers of values in the match table which do not match any of structures. Structure sub-collections 408 contain then the values identified in the match lists. Outlier sub-collections 410 contain then the values identified in the outlier match list. The corresponding ordinal sets may be also used to derive rough values.

In summary, there are several technical representations of the above constructs possible. For example, instead of lists arrays with appropriate information about particular elements of collections of values may be created and stored. Regardless of the choice of such structures, the structure sub-collections and outlier sub-collections are handled as described above, by means of their compression and rough value generation, where rough values may contain granules corresponding to particular sub-collections. Going further, each of sub-collections may contain values sharing the same rich semantic structure, which can be further taken into account as described in this disclosure.

As already mentioned, in some applications the data providers and domain experts may express the attribute semantics by means of the data schema changes. However, in many situations, the data schemas must remain untouched because of high deployment costs implied by any modifications. Moreover, unmodified schemas may provide the end users with conceptually simpler means for querying the data. The domain experts also may prefer injecting their knowledge independently from standard database model levels, rather than cooperating with the database architects and administrators.

In certain situations domain experts may not really be needed to let the system know about the data content semantics, as there are a number of approaches to recognize the data structures automatically. However, it is unlikely that all application specific types of value structures can be detected without human interaction. Therefore, expert knowledge is often valuable and useful, and an interface for obtaining such input may be useful.

As an example of the language that human experts may use to communicate with the system described in this disclosure, let us consider regular expressions. Consider the example of attribute with URI strings. Because of the relative complexity of a regular expression which is heavily dependent on the context of the string or attribute that it is tied to, when matching an attribute that is expected to almost always be a URI, the following (incomplete) regular expression may be used:

```
^(?P<scheme>[:alpha:][A-Za-z+-.]*)
(?P<separator>://)
(?P<hierarchicalPart>
(?P<authority>[ @]*(?:@))??
(?P<hostname>
  (?i)
  (?: [a-z0-9]\. |
    [a-z0-9][-a-z0-9]*[a-z0-9]
    \. )+
  (?: com|
    edu|
    gov|
    int|
    mil|
    net|
    org|
    biz|
    info|
    name|
    museum|
    coop|
    aero|
    [a-z][a-z]
  )))$
```

In the above example, some variable and literal (constant) parts of the structure can be identified. Eventually, as a result of this methodology, the variable parts will be gathered in structure sub-collections of original values of their particles. The literals do not need to be stored this way, as it is just enough to remember about them at the structure definition level, in order to recreate the original or encoded values whenever necessary. (In case of a need for encoded values, the usage of literals may be quite limited.) In general, regardless of whether regular expressions or some other languages are considered, the storage and rough values optimizations can benefit mostly from: expressing values (or some of their smaller particles) as concatenations of their semantic particles, expressing values (or some of their smaller particles) as variable-length sequences of their simpler semantic particles (this is often referred as Kleene operator), and expressing values (or some of their smaller particles) as alternative occurrences of some different sub-structures. As an example, in the above structure, there is, at one of lower levels, alternative between a number of literals such as "com", "edu" et cetera and a structure encoding two-character strings. Such alternative can be supported by the match list analogous to that defined previously at the level of whole original values and structures in the structure dictionary. Sub-collections of even simpler particles can be then identified and compressed independently. In the above example, a match list would store information about occurrence of literals and two-character variables. Then, a sub-collection of two-character variables would be stored and compressed separately. This way, situations when some of the lower-level semantic particles are missing or look like outliers can also be expressed. The whole procedure can be also repeated for constructing more detailed rough values that refer to particular sub-collections.

This method is particularly beneficial for deriving rough and encoded values that may support the whole string matches on string attributes. Queries involving matches based on regular expressions (and even the simplified subclass defined by the LIKE syntax in ANSI standard SQL) decompose to the PSPACE-hard or PSPACE-complete problems of resolving whether two regular grammars are equivalent in the strings that they are able to generate. While this is a difficult problem to solve in tractable time, it is still possible to apply some heuristics to produce such implementation of rough value functions that are used by query optimization and execution modules that can eliminate large groups of suspect data, performing better on average than the brute force method of inspecting every data pack and executing the match pattern.

If rough values are efficient enough, then data packs are often classified as fully irrelevant or relevant at the moment of requesting those packs' status by the query execution modules. It may happen at the moment of evaluating an SQL filter or join condition, but also at the moment of construction of, for example, SQL aggregations, wherein rough values and exact values of some data packs may influence the relevant/irrelevant/suspect status of other data packs. In case of fully irrelevant or fully relevant, the execution modules are usually able to continue with no need for decompression. For the remaining packs that are required to be accessed value by value, the size of the data portions to be taken from disk and the speed of converting them to a form that is processable by the execution modules are critical. The query execution modules sometimes require value codes instead of original values. In that case, rough values may be used to help generate the most optimal, such as, for example, the shortest, codes. The method based on domain knowledge about data content may help here as well. For example, knowing that the first semantic particle for all required content of a given data attribute may have a small number of distinct values (for example in case of the scheme name for URI strings), the query execution module can work on the strings with their first semantic particles replaced by shorter codes. This method may also assist in only partial decompression of a data pack content when particular values are requested. For example, if all values requested by the query execution modules from a given data pack belong to the same structure sub-collection, then there is no need to decompress other structure sub-collections. In this case, it is important that the query execution modules are not aware of such internal optimizations occurring inside data packs. This way, the overall architecture of the proposed method is easy to maintain and extend.

For example, as shown in FIG. 3, consider a schema 316, as depicted in Table A, consisting of a single attribute, 'maybeURL', of type 'VARCHAR(700)'. Some typical examples of operations performed on the database may be as follows:

```
-- projection
SELECT ... FROM A
   WHERE ... AND
   maybeURL = 'http://www.infobright.com';
-- aggregation
SELECT ... FROM A
   WHERE ... GROUP BY maybeURL;
-- match
SELECT ... FROM A
   WHERE ... AND
   maybeURL LIKE 'http%' OR
   maybeURL LIKE '%infobright%';
```

For the purposes of this example, assume that the database has been informed as to what a URI is. Through a regular grammar the particles have been defined. For example, in the complete parse of the URI expression, the particles of a URI are as follows:

Scheme name which consists of a sequence of characters beginning with a letter and followed by any combination of letters, digits, plus ("+"), period ("."), or hyphen ("-").

Hierarchical part which consists of authority and path and is intended to hold identification information about the resource.

Query, which is an optional part, which may contain additional identification information that is not hierarchical in nature.

Fragment, which provides additional information about secondary resources addressed by the URI.

Note that the descriptions above are concerned primarily with identifying the particle's structure. The particle's meaning provides guidance on how to achieve this identification of structure.

Figure 5:
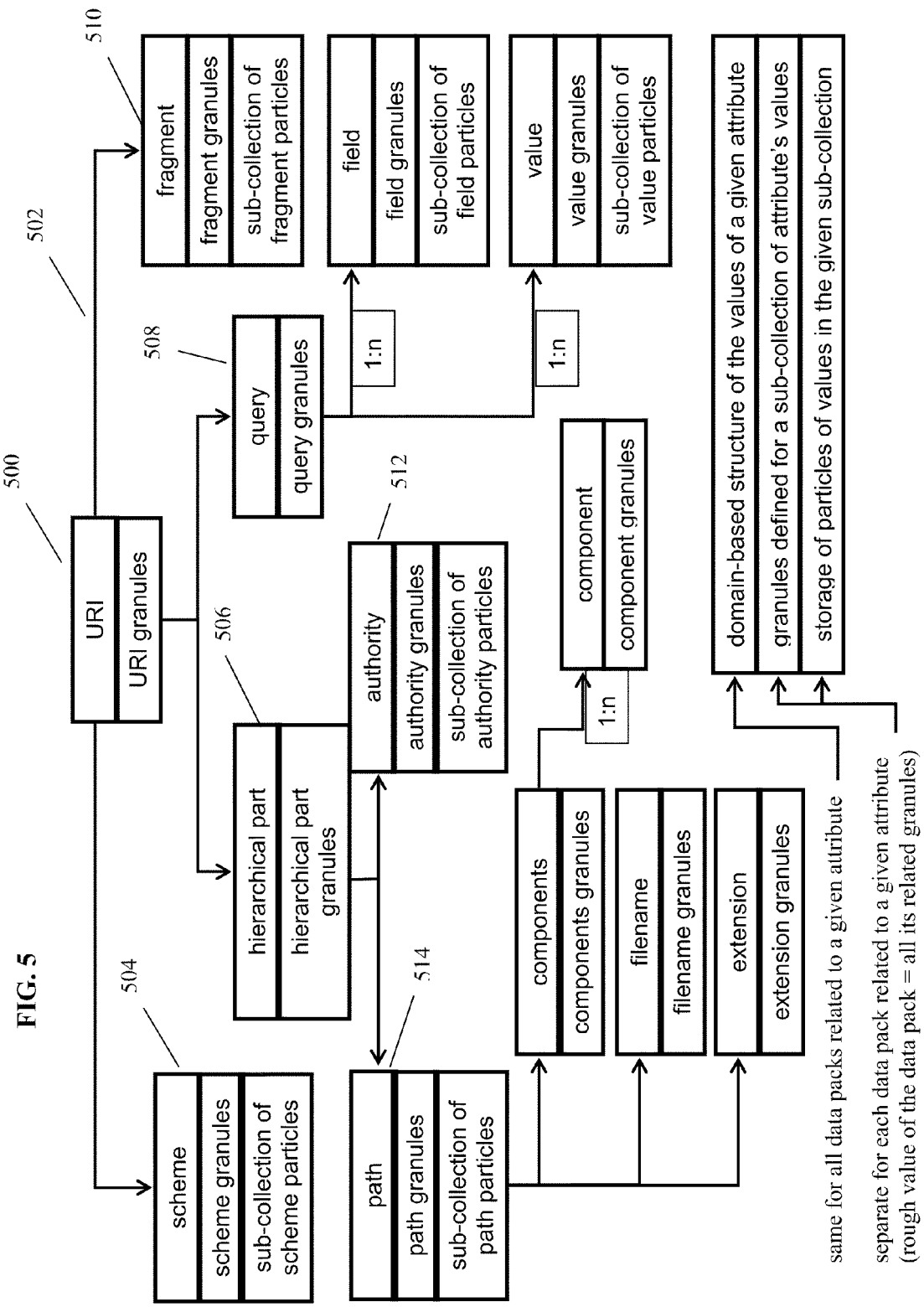
FIG. 5 shows the internal structure of a Universal Resource Identifier (URI) and the proposed storage of data packs and their rough values filled with the URI strings, for example, in the exemplary database engine, according to an embodiment of the present disclosure.

Once the structure is understood, collections and sub-collections for particles at all applicable levels of hierarchy can be prepared. As shown in FIG. 5, in the case of URI 500, collections 502 corresponding to URI would be at the top level, scheme 504, hierarchical part 506, query 508 and fragment 510 would be at the next level, and finally authority 512 and path 514 would be at the lowest level. These features are also depicted in the lower portion on the drawing in further detail. The 1:n notation means that some particles can be expressed as sequences of a variable number of simpler particles (which corresponds to Kleene operator).

It is also important to note that rough values may contain granules (rough particles) with information about particular sub-collections of particles. However, a choice of optimal level for creation of such granules may not go in pair with a choice of optimal level of storage of particles. For example, the additional granules understood as statistical snapshots can be built for the whole URI values with some of their semantic particles replaced by more compacted internal codes. On the other hand, it may be useful for querying to compute and store information about the filename particles although it may turn out that the storage is more efficient for sub-collections of the whole paths.

In the above example, a single regular expression is used. For production systems, it is possible that a series of regular expressions or grammars may be used to recognize and decompose types at load, a process roughly analogous to type unification in compiler theory.

There are several technical possibilities of representing that the values of the same attribute in a data set may have different structures, described by the already-mentioned (simplified) regular expressions or in some other language. One possibility is to maintain a structure dictionary for the given attribute and to use the match lists or match tables to identify elements of collections of values of that attribute that follow particular structures. Another possibility is to introduce decomposition rules, which assign different collections of values of the same attribute with possibly different subsets of structures. It is especially beneficial in cases when structures evolve over time, due to better interaction with domain experts or due to data changes. In such cases, the structure dictionary of old and new structures is maintained. For newly loaded data, decomposition rules representing new forms of structures are applied while the already stored collections of values remain optimized with respect to older structures. Technically, each data pack may include information about the decomposition rule applied to its collection of values. Decomposition rules can be then represented as alternatives of particular structures or may take more advanced forms where the structures stored in the structure dictionary can be embedded at various hierarchical levels.

Going now back to FIG. 3, a semantic matcher 318 applies the structure(s) defined, e.g., as regular expression(s) available for an attribute and a schema to the input data 302, one at a time. Each row of the input data 302 is assigned an ordinal number. The semantic matcher 318 runs a semantic matching procedure. For strings that match the structure completely (for example, which return 'True' as a match) a "1" is stored in a match table 310. In instances where there are multiple possible types of structures for a given attribute, the encoding used by the semantic matcher 318 may be more compound, e.g., on the first come first serve basis. As shown in FIG. 3, the semantic matcher 318 also records the encoded ordinal number to create a match list 304 of complete matches.

The parser 312 provides matches on the groupings that it was able to derive to create sub-collections 314 based on the particles. Similar parsing, matching and encoding is subsequently done for each sub-particle.

Figure 6:
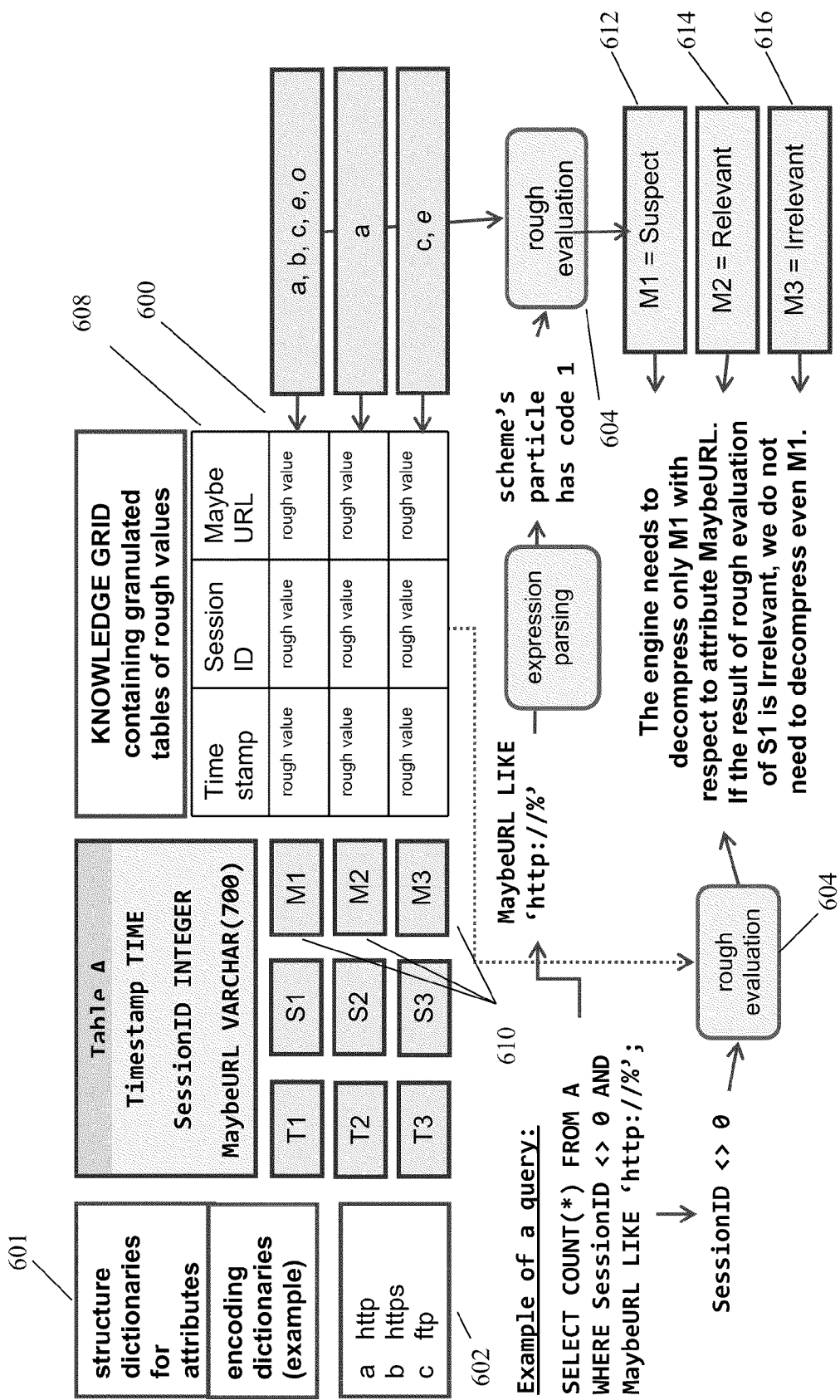
FIG. 6 shows a proposed semantic matching procedure and the usage of rough values in an application of the proposed methodology while querying, illustrated using the example of URI, according to an embodiment of the present disclosure.

As a final step, it is possible to derive new summary statistics for each computed sub-collection. As shown in FIG. 6, one simple but powerful example is the notion of computing and storing statistics over the codes of values dropping into each of collections and sub-collections. For example, consider that the load process fills 3 data packs M1, M2 and M3. Further, consider that the second data pack contains only "http" schemes and the third contains only URI strings where scheme name is empty or equal to "ftp". Assume there were no other scheme names than "http", "https" and "ftp" distinguished. In this case, if the scheme encoding is as set forth in Table 2, as follows:

TABLE 2

| Scheme | encoding |
|---|---|
| http | a |
| https | b |
| ftp | c |
| Empty | e |
| Outlier | o |

The scheme granules that are included into rough values might look like Table 3 as follows:

TABLE 3

| Data Pack ID | Scheme Ordinal Set |
|---|---|
| M1 | {a, b, c, e, o} |
| M2 | {a} |
| M3 | {c, e} |

As shown in FIG. 6, in addition to the normal query evaluation process, there are two additional steps which occur prior to query execution. The first step is expression encoding 600. In this step, as part of the current process of query plan generation, instead of generating a fixed plan, a NFA/DFA may be derived based on the pattern or condition for which filtering or aggregating is being performed. The expression encoding 600 is derived from the structure definition 601 and its constituent encoded values 602 at the level of collection and sub-collection. In the simplest case, a derived match is produced based on the available sets of ordinal numbers. More compound formulations are possible and necessary to handle the full class of regular expressions. The second step is rough evaluation 604. In this step, the rough evaluation is modified to take into account the granules of rough values computed for structures in the structure dictionary, using encoded values whenever available according to additional encoding dictionaries for particular particles of structures. Rough evaluation 604 means checking whether the data pack is relevant, suspect or irrelevant based on its rough value. For query optimization and query execution modules, the functionality of rough evaluation functions remains the same, although the rough evaluation functions are implemented more effectively internally, as they are aware of structures occurring in data and are able to store granules, which are statistics for particular particles of values, or higher-level granules that are statistics built over original values with some of their particles replaced by more compacted codes.

In the example shown in FIG. 6, the expression encoding 600 and rough evaluation 604 provide a match ordinal of "1"—meaning that the string "http" has been derived as the scheme particle that will provide a match. Rough evaluation of the data packs may then be performed, and based on the scheme granules inside rough values 608, of the three data packs 610, some values in M1 612 may contain "http" at the beginning, all values in M2 614 contain "http" at the beginning, and there are no values in M3 616 containing "http" at the beginning Therefore, the query execution module will know that M1 is suspect, M2 is relevant and M3 is irrelevant with respect to the MaybeURL LIKE 'http://' part of the SQL condition considered in FIG. 6. This result is then combined with the outcome of rough evaluation of the same rough rows with respect to rough values for their data packs corresponding to attribute SessionID and the SessionID <> 0 part of the SQL condition considered in FIG. 6, where combination of rough outcomes is described in U.S. Patent Publication No. 2008/0071748

As already discussed, the domain knowledge about data content must be appropriately provided to the system. Thus, there is a need for interfaces enabling the data providers to inject their domain knowledge directly into a database engine, with no changes to data schemas. This way, the end users are shielded from the complexity of semantic modeling, while reaping most of its benefits. An example of one type of interface that may be implemented is described below. An example of the language that may be used to express the structural complexity of attribute values is a highly simplified version of the regular expressions framework. Various prototypes were developed and experiments run that were focused on the use of regular expressions to define the particles of a type. However, other languages and representations may be used, provided that the representation language used is very important irrespective of whether data content information is acquired via interfaces or is learned automatically or semi-automatically, such as, for example, by using algorithms to adjust optimal levels of decomposition of the original values according to hierarchical definitions recommended by domain experts. As described below, another, very simple interfacing language that led to significant gains in compression ratios and query/load speeds was implemented.

The example described below of a sample framework extends the most basic idea of assigning attributes with structures gathered in the structure dictionary. Structures occurring for a given attribute (such as, for example, URIs and integers for MaybeURL, as shown in FIG. 4) are represented within a single decomposition rule. Such decomposition rule may be treated as a disjunction of possible structures, such as, for example, URI or integer or NULL or outlier, although its expressive power may go beyond simple disjunctions. The main proposed components are as follows: 1) dictionary of available decomposition rules, 2) applying decomposition rules to data attributes, and 3) parsing values through decomposition rules.

The first component—the dictionary of available decomposition rules—corresponds to the system table decomposition_dictionary that holds all available decomposition rules that are able to assign (the subsets of) structures stored in the structure dictionary to data packs. The table is located, for example, in the system database sys_infobright and is created at ICE/IEE's installation. The table contains three attributes: ID (name of a decomposition rule), RULE (definition of a decomposition rule), and COMMENT (additional comments, if any). The rules can be added and modified with help of the following three stored procedures:

CREATE_RULE(id,rule,comment)
UPDATE_RULE(id,rule)
CHANGE_RULE_COMMENT(id,comment)

In the discussed example of a sample framework, the decomposition_dictionary table accepts rules defined in the simplistic language accepting concatenations of three types of primitives:

Numeric part: Nonnegative integers, denoted as %d.
String part: Arbitrary character sequences, denoted as %s.
Literals: Sequences of characters that have to be matched exactly.

For instance, the IPv4 and email addresses can be expressed as %d.%d.%d.%d and %s@%s, respectively, where "." and "@" are literals. Such language can be further extended, by composition (disjunction, alternative) or Kleene closure (repeating the same pattern variably many times).

Also, the new types of primitives, such as single characters, may be considered. Generally, many languages, such as the above one or various forms of simplifications of regular expressions can be considered.

The next component—applying decomposition rules to attributes—is realized by the system table that contains four attributes: DATABASE_NAME, TABLE_NAME, COLUMN_NAME, and DECOMPOSITION. This table stores assignments of rules to data attributes identified by its first three attributes. The forth attribute is a foreign key of ID from decomposition_dictionary. There are two auxiliary stored procedures provided to handle the rule assignments:

SET_DECOMPOSITION_RULE(database,table,column, id)

DELETE_DECOMPOSITION_RULE(database,table, column)

For example, the following statement
CALL SET_DECOMPOSITION_RULE('NETWORK', 'CONNECTION','IP','IPv4');
means that the attribute IP in the table CONNECTION will be handled by the decomposition rule IPv4, due to its definition in decomposition_dictionary.

If one of the existing rules needs to be revised by a domain expert, there are two possibilities: 1) altering the rule's definition per se if its general pattern is wrong, or 2) linking a specific data attribute to another rule. A special case of the second above option is when the rule itself does not need to change but the structures from the structure dictionary that it refers to need to be modified. Once the rule's definition or assignment is changed, new data portions will be processed using the new configuration but already existing data packs will remain unmodified.

The last component—parsing values through decomposition rules—should be considered for each data pack separately. Data packs contain in their headers information about the applied rule. Some other simple solutions for keep the track of decomposition rules applied to particular data packs are possible too. Therefore, at this level, the architecture implements the above-mentioned flexibility in modifying decomposition rules—for the given attribute, different packs can be parsed using different rules.

Internal structure of data packs follows FIG. 3. In the match table 310, given the above-described language limitations, there is a unique code for all values successfully parsed through the decomposition rule, with additional codes for NULLs and outliers. The language may be enriched with disjunctions, thereby rendering the codes less trivial and providing for match tables to reoccur at various decomposition levels. The sub-collections to be compressed correspond to the %d and %s primitives of parsed values. Separate sub-collections 308 may contain string outliers and/or integers. Previously-developed algorithms, as described in U.S. Patent Publication No. 2008/0071818, may be applied for compressing sequences of numeric, string and/or binary values. Some other widely known compression algorithms can be easily applied at this stage as well. The original data packs can be reassembled by combining decompressed sub-collections, using the match tables and decomposition rules' specifications.

This framework may have a potential impact on data load, data size, and data access. It also yields some new types of design tasks. For example, it leads towards higher complexity of rough values, which increases the difficulty of their storage and usage. The significant advantage of rough values lays in their relatively small size. On the other hand, in the case of long, richly structured string attributes, over-simplistic rough values are not likely to be sufficiently efficient. To summarize, for collections of more compound string values we should produce more compound rough values, with a ratio of the size of original collections of values and the size of their corresponding rough values kept at the same level as described in U.S. Patent Publication No. 2008/0071748.

In one example, the framework described above was tested against string attributes in the real-world tables provided by the ICE/IEE users. Decomposition rules were chosen according to preliminary analysis of data samples. The rules were evaluated with respect to the three following aspects that are crucial for the users:

Load time: This includes parsing input files and compressing data packs. With a decomposition rule in place, the parsing stage also includes matching the values in each of the data packs against the rule's structure. For more compound rules the input files take more time to load. More compound rules, however, also lead to a higher number of simpler sub-collections that may be all together compressed faster than collections of original string values.

Query time: This is related to decompression speed and to the cost of composing separately stored particles of values into original values. Decompression and compression speeds are not necessarily correlated. For example, for sub-collections of numeric values or smaller particles of values the decompression routines are much faster than corresponding compression. Query time may be reduced due to higher efficiency of rough values, yielding less frequent data pack accesses. This is likely to be more significant than any overheads related to storing and using more compound rough values.

Disk size: This is primarily related to data compression ratios. The rules decompose values into their smaller particles, whose sub-collections are compressed independently by better adjusted algorithms. For example, it may happen that some particles of compound strings are integers. In that case, numeric compression may result in smaller output, even though there is additional overhead related to representing packs by means of multiple sub-blocks.

Table 4 illustrates load time, query time, and disk size for the corresponding decomposition rules, measured relative to the situation with no domain knowledge in use. For simplicity, we do not produce advanced rough values in this experiment. This means that there are no changes at the level of rough values, i.e., they are created as if there was no domain knowledge available. Data tables containing single string attributes were examined. The results were averaged over 10 runs. Load time is likely to increase when decomposition rules are applied. However, some promising query speedups were observed. Overall, compression ratios were, although there were some deviations. For example, decomposition rule %s://%s.%s.%s/%s did not lead to the possibility of applying compression algorithms that would be adjusted significantly better to particular URI particles. On the other hand, URI decomposition paid off as a result of decreased query times. In this case, shorter strings turned out to be far easier to process, which overpowered the overhead related to a need of concatenating them into original values after decompression.

Besides the data set containing web sites parsed with the above-mentioned URI decomposition rule, also considered were IPv4 addresses and some identifiers originating from telecommunication and biogenetic applications. Such cases represent mixtures of all types of the currently implemented primitives: numerics (%d), strings (%s), and literals (such as AA or gi in Table 4).

TABLE 4

Experiments with three aspects of ICE/IEE efficiency: load time, query time, and disk size. Query times are reported for SELECT * FROM table INTO OUTFILE. The results are compared with domain-unaware case. For example, query time 50.1% in the first row means that the given query runs almost two times faster when the corresponding decomposition rule is used. Five data sets with single string attributes are considered, each of them treated with at least one decomposition rule. There are five rules studied for the last set.

| Data Type | Decomposition Rule | Load Time | Query Time | Disk Size |
|---|---|---|---|---|
| IPv4 | %d.%d.%d.%d | 105.8% | 50.1% | 105.9% |
| id_1 | 00%d%sAA%s%d-%d-%d | 156.4% | 96.1% | 87.6% |
| id_2 | gi%d-%s_%s%d%s | 92.7% | 61.8% | 85.1% |
| URI | %s://%s.%s.%s/%s | 135.3% | 89.7% | 152.6% |
| Logs | notice 1 | 113.3% | 88.1% | 67.5% |
|  | notice 2 | 113.2% | 105.4% | 97.0% |
|  | notice 3 | 113.1% | 82.2% | 61.5% |
|  | 1, 3 generalized | 103.6% | 71.2% | 40.9% |
|  | notices 1, 2, 3 generalized | 132.2% | 100.4% | 82.2% |

The last case (denoted as logs) refers to the data set, where each value follows one of three, roughly equinumerous distinct structures (denoted as notices 1, 2, and 3) related to three subsystem sources. Given that the considered example of the language of domain injections does not support disjunction, the decomposition rule was first adjusted to notice 1, 2, or 3. However, fixing the rule for one of notices resulted in 66% of values treated as outliers. Nevertheless, Table 4 shows that for notices 1 and 3 it yields quite surprising improvements. More general rules addressing multiple notices but not going so deeply into some of their details was also investigated. This means that some particles that could be more finely decomposed were compressed as longer substrings. When using such a rule for notices 1 and 3, with 33% of outliers (for notice 2) and a slightly courser way of compressing 66% of values (for notices 1 and 3), the best outcome with respect to load speed, query speed, and compression ratio were obtained. Further rule generalization aiming at grasping also notice 2 resulted in losing too much with respect to values corresponding to structures 1 and 3.

In summary, the above example shows that the same attributes can be assigned with different rules and that the benefits of the different rules cannot be effectively determined without monitoring data and queries. Evolution of the domain knowledge and adaptive methods of adjusting that knowledge to the data problems are necessary. Regardless of whether the optimal approach to understanding and conducting such evolution is manual or automatic, it is still necessary to gather the feedback related to various database efficiency characteristics and attempt to translate it, for example, towards the decomposition rule recommendations. Furthermore, allowing domain experts to describe the content of their data leads to substantial opportunities for improvement.

Embodiments of the present invention involve computer software and hardware, for example in the form of servers, point of sale terminals, personal computers, mobile computer-based devices, mobile phones, and the like. Such devices and software generally execute algorithms which implement methods that are embodiments of the present invention. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

The present invention can be implemented with apparatus to perform the operations described herein. This apparatus may be specially constructed for the required purposes, or may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

Thus, methods and systems for optimizing the organization of a relational database so as to improve the efficiency of executing search queries on the database have been described.

What is claimed is:

1. A method of managing metadata in a relational database system using a processor, the metadata created in a form of rough values corresponding to collections of values, wherein each rough value represents summarized information about values, wherein the values are elements of the corresponding collection of values, and wherein each rough value being substantially smaller than the corresponding collection of values, the method comprising:

assigning a collection of values to a structure dictionary, wherein each of the values represents the value of a row for an attribute and has a unique ordinal number within the collection, and wherein the structure dictionary contains structures defined based on at least one of interaction with a user of the system via an interface, automatic detection of structures occurring in data, and predetermined information about structures relevant to data content that is stored in the system;

forming a match granule containing summarized information about the assignment of the ordinal numbers of the elements in the collection of values to the structures in the structure dictionary;

for each structure in the structure dictionary, forming a structure granule containing summarized information about one or more elements in the collection of values for which an ordinal number was assigned to the structure;

and gathering summarized information represented by the match granule and one or more structure granules to form a rough value.

2. The method according to claim 1, further comprising at least one of inserting, updating and deleting values from a collection of values, and where the rough value corresponding to the collection of values has been modified by the at least one of inserting, updating and deleting values, at least one of:

immediately re-forming the rough value to reflect the modification;

maintaining the rough value in its previous form but with additional information, including which of its components are not up-to-date with respect to the new content of the collection, and what is the type of inexactness of not up-to-date components of said rough value, wherein the type of the inexactness is related to at least one of potentially suboptimal query processing and query processing resulting in potentially inexact results;

evaluating whether the rough value should be re-formed based on a group of criteria including at least one of minimizing the cost of re-forming not up-to-date components of the rough value, minimizing the risk of query processing resulting in inexact results caused by, not up-to-date components of the rough value, and maximizing the estimated efficiency of using the rough value while resolving queries, the rough value being accessible independently from the collection of values, the rough value being applied to minimize the amount of accesses to the collection of values while resolving queries; and provided an interface to a user of the system, the interface reporting the cost of re-forming the rough value, the risk of query processing resulting in inexact results caused by not up-to-date components of the rough value, and the estimated efficiency of using the rough value while resolving queries, the rough value being accessible independently from the collection of values, the rough value being applied to minimize the amount of accesses to the collection of values while resolving queries, and the user being able to decide whether and when the components of the rough value should be re-formed.

3. The method of claim 2, wherein the evaluating is based on heuristic optimization algorithms including at least one of greedy, randomized, and AI-based algorithms.

4. The method according to claim 1, wherein the structure dictionary is modifiable and the methods of modifying the structure dictionary include at least one of:

automatically detecting structures occurring in data, automatically adding detected structures to the structure dictionary or recommending said detected structures to a user of the system via an interface, wherein the user determined whether to add the detected structures to the structure dictionary;

evaluating a plurality of candidate structures based on a group of criteria including at least one of minimizing the number of structures, minimizing the amounts of values not matching any of the structures, minimizing the cost of creating the structure granules corresponding to the structures, and maximizing the estimated efficiency of using the structure granules while resolving queries, wherein the structure granules are accessible independently from sub-collections of values matching the structures, and wherein the structure granules are applied to minimize the amount of accesses to the sub-collections of values matching the corresponding structures while resolving queries; and providing an interface to a user of the system, the interface reporting the amounts of values matched by particular structures, the cost of creating the structure granules corresponding to the structures, and the estimated efficiency of using the structure granules while resolving queries, wherein the structure granules are accessible independently from sub-collections of values matching the structures, wherein the structure granules are applied to minimize the amount of accesses to the sub-collections of values matching the corresponding structures while resolving queries, and wherein the user is able to remove the structures from the structure dictionary and add the structures to the structure dictionary.

5. The method of claim 4, wherein the evaluating is based on heuristic optimization algorithms including at least one of greedy, randomized, and AI-based algorithms.

6. The method according to claim 1, further comprising at least one of adding structures into and modifying the structures in the structure dictionary, and at least one of:

immediately re-forming the rough values to reflect the at least one of the addition and modification;

applying the at least one addition and modification to rough values corresponding to collections of values with new values inserted, or old values deleted or updated after said modification occurred, but not to already existing rough values;

evaluating whether said addition or modification should be applied to re-form the already existing rough values based on a group of criteria including at least one of minimizing the cost of forming the structure granules corresponding to the added or modified structures and maximizing the estimated efficiency of using rough values while resolving queries, wherein the rough values are accessible independently from their corresponding collections of values, and the rough values are applied to minimize the amount of accesses to said corresponding collections of values while resolving queries; and providing an interface to a user of the system, said interface reporting the cost of forming the structure granules corresponding to the added or modified structures and the estimated efficiency of using rough values while resolving queries, wherein the rough values are accessible independently from their corresponding collections of values, said rough values are applied to minimize the amount of accesses to said corresponding collections of values while resolving queries, and said user is able to decide whether the modified structure dictionary should be applied to re-form rough values.

7. The method of claim 6, wherein the evaluating is based on heuristic optimization algorithms including at least one of greedy, randomized, and AI-based algorithms.

8. The method according to claim 1, wherein at least one of:
the match granule includes information as to whether all values in the corresponding collection of values are matched by at least one of the structures in the structure dictionary; and
the match granule includes the list of structures in the structure dictionary that are matched by at least one of the values in the corresponding collection of values.

9. The method according to claim 1, wherein at least one value can be matched by two or more structures in the structure dictionary and the match granule includes summarized information about matching of said values by all said structures.

10. The method according to claim 1, wherein methods of forming at least one structure granule corresponding to a sub-collection of values for which an ordinal number was assigned to the structure in the structure dictionary include at least one of:
defining an order over a domain of all possible values of said structure and including information about the minimum and the maximum values in the sub-collection of values matching said structure in said structure granule, and wherein said minimum and said maximum are derived according to said order;
taking ordinal numbers from a list of possible values, wherein there is an ordered list of possible values of said structure and each structure granule corresponding to said structure includes information about ordinal numbers of values in said sub-collection;
evaluating the methods of forming structure granules based on a group of criteria including at least one of minimizing the cost of creating the structure granules according to said candidate methods and maximizing the estimated efficiency of using structure granules created according to said candidate methods while resolving queries, wherein said structure granules are accessible independently from sub-collections of values matching said structures, and said structure granules are applied to minimize the amount of accesses to said sub-collections of values matching said corresponding structures while resolving queries; and
providing an interface to a user of the relational database system, said interface reporting the cost of creating the structure granules according to said candidate methods and the estimated efficiency of using structure granules created according to said candidate methods while resolving queries, wherein said structure granules are accessible independently from sub-collections of values matching said structures, said structure granules are applied to minimize the amount of accesses to said sub-collections of values matching said corresponding structures while resolving queries, and said user is able to add and remove the methods of forming the structure granules.

11. The method of claim 10, wherein the evaluating is based on heuristic optimization algorithms including at least one of greedy, randomized, and AI-based algorithms.

12. The method according to claim 1, wherein a structure in the structure dictionary takes a form of a word built using an alphabet of symbols taking a form of constants corresponding to at least one of alpha-numeric strings and characters, and variables corresponding to at least one generic data type, said word being built using formation rules of a formal language.

13. The method of claim 12, wherein the generic data type is at least one of numeric, alpha-numeric and binary.

14. The method of claim 12, wherein the language is a recursively enumerable language.

15. The method according to claim 12, wherein a word in the structure dictionary is modifiable and methods of modifying said word include at least one of:
detecting symbols in the word that can be replaced by more detailed sub-words, automatically adding new words obtained by replacing the symbols in the structure dictionary by the sub-words, or recommending the new word to a user of the system via an interface, the user deciding whether to add the new word to structure dictionary and whether said word should remain in the structure dictionary;
evaluating the candidate word modifications based on a group of criteria including at least one of minimizing the number of symbols that said word modifications are formed from and maximizing the estimated efficiency of using the structure granules while resolving queries, said structures being represented by said word modifications, said structure granules being accessible independently from sub-collections of values matching said word modifications, said structure granules being applied to minimize the amount of accesses to sub-collections of the values' portions matching symbols that said word modifications are formed from while resolving queries; and
providing an interface to a user of the system, said interface reporting the number of symbols that the candidate word modifications are formed from and the estimated efficiency of using the structure granules while resolving queries, said structures being represented by said word modifications, said structure granules being accessible independently from sub-collections of values matching said word modifications, said structure granules being applied to minimize the amount of accesses to sub-collections of the portion of the values matching symbols from which said word modifications are formed while resolving queries, said user being able to decide whether said word modifications should be added to the structure dictionary.

16. The method of claim 15, wherein the evaluating is based on heuristic optimization, including at least one of greedy, randomized, and AI-based algorithms.

17. The method according to claim 12, wherein the methods of forming the structure granules corresponding to a word in the structure dictionary are preceded by at least one of the following:
assigning an ordered list of possible values to at least one of the symbols from which said word is formed and for each said symbol and each value matching said word modifying said value by replacing its portions corresponding to said symbol with their ordinal numbers, wherein said ordinal numbers are taken from said list of possible values, and wherein said list of possible values is a component of any further formed structure granules representing summarized information about the sub-collection of such modified words; and for at least one of the symbols corresponding to an alphanumeric data type, identifying the maximum common prefix of all values' portions matching said symbol, and for each said symbol and each value matching said word, modifying said value by removing said maximum common prefix from its portions corresponding to said symbol, said maximum common prefix being a component of any further formed structure granules representing summarized information about the sub-collection of such modified words.

18. The method according to claim 12, wherein the method of forming at least one structure granule for a sub-collection of values for which an ordinal number was assigned to a word in the structure dictionary comprises:

for each of symbols that said word is formed from, selecting one or more of the methods of forming symbol granules corresponding to said symbols, said symbol granules representing summarized information about said portions of the values corresponding to said symbols; and forming said at least one structure granule by gathering summarized information represented by said symbol granules.

19. The method according to claim 18, wherein the methods of forming the symbol granule for one of the symbols from which the word in the structure dictionary is formed include at least one of:

defining an order over a domain of all possible values of said symbol and including information about the minimum and the maximum values in the sub-collection of values matching said symbol in said symbol granule, wherein said minimum and said maximum values are derived according to said order;

taking ordinal numbers from a list of possible values, wherein there is an ordered list of possible values of a symbol and the symbol granules corresponding to said symbol include information about distinct ordinal numbers of the values' portions corresponding to said symbol;

evaluating the candidate methods of forming the symbol granules based on a group of criteria including at least one of minimizing the cost of creating the symbol granules according to said candidate methods and maximizing the estimated efficiency of using symbol granules created according to said candidate methods while resolving queries, wherein said symbol granules are accessible independently from sub-collections of values' portions matching said symbols, and said symbol granules are applied to minimize the amount of accesses to said sub-collections of values' portions matching said corresponding symbols while resolving queries; and providing an interface to a user of the system, said interface reporting the cost of creating the symbol granules according to said candidate methods and the estimated efficiency of using symbol granules created according to said candidate methods while resolving queries, wherein said symbol granules are accessible independently from sub-collections of values' portions matching said symbols, said symbol granules are applied to minimize the amount of accesses to said sub-collections of values' portions matching said corresponding symbols while resolving queries, and said user is able to add and remove the methods of forming the symbol granules.

20. The method according to claim 18, wherein the method of forming the symbol granule corresponding to a symbol from which a word in the structure dictionary is formed comprises:

assigning the collection of portions of the values corresponding to said symbol with a sub-structure dictionary containing sub-structures defined based on at least one of: interaction with a user of the system, wherein the algorithms automatically detect sub-structures occurring among said portions of the values corresponding to said symbol, or predefined information about sub-structures relevant to said values' portions corresponding to said symbol;

forming a sub-match granule by representing summarized information how the portions of the values corresponding to said symbol match said sub-structure;

forming sub-structure granules representing summarized information about the portions of the values corresponding to said symbol that match particular sub-structures; and forming said symbol granule as gathering summarized information represented by said sub-match granule and said sub-structure granules.

21. The method according to claim 18, wherein the method of forming the structure granule corresponding to a word in the structure dictionary comprises:

selecting the set of sub-words of said word based on at least one of interaction with a user of the system and the algorithms automatically evaluating said candidate sub-words; and forming said structure granule out of the sub-word granules, wherein each of said sub-word granules is formed as corresponding to said selected sub-words or said word.

22. The method according to claim 1, wherein there are groupings of data rows and each collection of values contains the values of a single data attribute for a single said grouping of data rows, collections of values corresponding to the same attribute being assigned with the same structure dictionary and the same methods of forming the match granules and structure granules.

23. The method according to claim 22, wherein scenarios for groupings of data rows include at least one of:

each of said groupings contains a single data row;

there is a single grouping containing all data rows;

each of said groupings contains 65,536 data rows;

at least one of the groupings contains a different amount of rows;

heuristic optimization algorithms including at least one of: greedy, randomized, and AI-based algorithms, the algorithms evaluating the candidate groupings of data rows based on minimizing the number of collections of values corresponding to the same attributes that include outliers with respect to structures assigned to such attributes;

heuristic optimization algorithms including at least one of: greedy, randomized, and AI-based, the algorithms evaluating the candidate groupings of data rows based on a group of criteria including at least one of minimizing the number of distinct structures in collections of values and maximizing the differences between the structure granules corresponding to different collections of values corresponding to the same attributes; and for at least two attributes in a relational data schema, structures in the structure dictionary being assigned to at least one of the two attributes describing semantic relationships of at least one of its values with at least one of the values of the other attribute, heuristic optimization algorithms including at least one of: greedy, randomized, and AI-based algorithms, the algorithms evaluating the candidate groupings of data rows based on at least one of minimizing the number of distinct structures in the collections of values of at least one of the two attributes describing a semantic relationship with the value of other attribute and maximizing the differences between the structure granules corresponding to the collection of values corresponding to the at least one of the two attributes, said structure granules describing the semantic relationship of at least one of its values with at least one of the values of the other attribute.

24. The method according to claim 22, wherein, for a data attribute assigned to a structure dictionary, the methods of forming a structure granule belonging to the structure dictionary include at least one of:

defining an order over a domain of all possible values of said structure and including information about the minimum and the maximum values in the sub-collection of values matching said structure in said structure granule, wherein said minimum and said maximum values are derived according to said order, said order being the same for all collections of values corresponding to said attribute;

an ordered list of possible values of a structure in the structure dictionary and the structure granules corresponding to said structure include information about distinct ordinal numbers of values occurring among the values matching said structure, said ordinal numbers being taken from said list of possible values, said list of possible values being the same for all collections of values corresponding to said attribute;

said structure takes a form of a word built from an alphabet of symbols taking a form of constants corresponding to alpha-numeric strings and characters, and variables corresponding to generic data types including numeric, alpha-numeric and binary data types, building said word using formation rules of a formal language, representation of said structure as said word being applied to build the structure granules corresponding to said structure in the same way for all collections of values corresponding to said attribute;

evaluating the candidate methods of forming the structure granules based on a group of criteria including at least one of minimizing the overall cost of creating the structure granules according to said candidate methods and maximizing the estimated efficiency of using structure granules created according to said candidate methods while resolving queries, wherein said structure granules are accessible independently from collections of values matching said structures, and said structure granules are applied to minimize the amount of accesses to said collections of values matching said corresponding structures while resolving queries, said overall cost and said estimated efficiency being measured for all collections of values corresponding to said attribute; and providing an interface to a user of the system, said interface reporting the overall cost of creating the structure granules according to said candidate methods and the estimated efficiency of using structure granules created according to said candidate methods while resolving queries, wherein said structure granules are accessible independently from collections of values matching said structures, said structure granules are applied to minimize the amount of accesses to said collections of values matching said corresponding structures while resolving queries, said user is able to add new and remove old methods of forming structure granules, said user's decisions affecting all collections of values corresponding to said attribute.

25. The method of claim 24, wherein the formal language is recursively enumerable language.

26. The method of claim 24, wherein the evaluating is based on heuristic optimization, including at least one of greedy, randomized, and AI-based algorithms.

27. The method of claim 22, wherein, for a data attribute assigned to a structure dictionary, each collection of values corresponding to the data attribute is assigned by a decomposition rule with a subset of structures in the structure dictionary, by:

providing a first interface to a user of the system, said first interface enabling the user to define and add new structures to the structure dictionary;

providing a second interface to a user of the system, said second interface enabling the user to change the decomposition rule to be used for new collections of values corresponding to the data attribute;

storing information about the current and all previous decomposition rules together with information about which collections of values correspond to each of the decomposition rules; and for each collection of values, composing its rough values according to the subset of structures that the decomposition rule assigns to the corresponding collection of values.

* * * * *